United States Patent

Hayabuchi et al.

Patent Number: 5,547,436
Date of Patent: Aug. 20, 1996

[54] CONTROL SYSTEM FOR AUTOMATIC TRANSMISSION

[75] Inventors: Masahiro Hayabuchi; Masaaki Nishida, both of Anjo; Yoshihisa Yamamoto, Nishio; Kazuhiro Mikami, Kariya; Hiroshi Tsutsui, Nishio; Akihito Iwata, Hekinan, all of Japan

[73] Assignee: Aisin AW Co., Ltd., Japan

[21] Appl. No.: 428,551

[22] Filed: Apr. 25, 1995

[30] Foreign Application Priority Data

Jun. 21, 1994 [JP] Japan ........................... 6-139212

[51] Int. Cl.$^6$ ................. F16H 61/20; F16H 59/04; F16H 59/14; F16H 59/22
[52] U.S. Cl. ................. 477/114; 475/120; 475/125
[58] Field of Search ................. 477/114; 475/120, 475/125

[56] References Cited

U.S. PATENT DOCUMENTS

| | | | |
|---|---|---|---|
| 4,643,049 | 2/1987 | Nishikawa et al. | 477/114 |
| 4,660,042 | 4/1987 | Nishikawa et al. | 477/114 X |
| 4,730,708 | 3/1988 | Hamano et al. | 477/114 |
| 4,829,853 | 5/1989 | Sakaguchi | 477/114 |
| 4,879,925 | 11/1989 | Taga et al. | 74/867 |
| 4,891,758 | 1/1990 | Simonyi et al. | 477/114 X |

FOREIGN PATENT DOCUMENTS 5-79562  3/1993  Japan .

*Primary Examiner*—Charles A. Marmor
*Assistant Examiner*—Nathan O. Jensen
*Attorney, Agent, or Firm*—Lorusso & Loud

[57] ABSTRACT

A control system for an automatic transmission in a vehicle powertrain including an engine and a fluid coupling for transmitting the rotation of an engine to the transmission, the transmission having a clutch which is applied responsive to selection of a forward running range and a hydraulic servo for applying the clutch responsive to an oil pressure. The control system includes a control unit for controlling the oil pressure to the hydraulic servo; an input torque detector for detecting the input torque to be inputted to the transmission; and a specific state detector for detecting satisfaction of a set of specific starting conditions including: (1) that the forward running range has been selected, (2) that the vehicle is stopped and (3) that the engine is in an idling state. The control unit sets the oil pressure to the hydraulic servo to correspond to the input torque at the instant of detection of satisfaction the specific starting conditions, and includes: a first pressure-reducer for abruptly reducing the oil pressure of the hydraulic servo to a set oil pressure immediately before the release of the clutch is started; and a second pressure-reducer for gradually reducing the oil pressure of the hydraulic servo, which has been reduced to the set oil pressure by the first pressure-reducer.

3 Claims, 19 Drawing Sheets

|   |   | Solenoid | | | Clutch | | | Brake | | | | One-way Clutch | | |
|---|---|---|---|---|---|---|---|---|---|---|---|---|---|---|
|   |   | S1 | S2 | S3 | C1 | C2 | C3 | B1 | B2 | B3 | B4 | F1 | F2 | F3 |
|   | R | × | ○ | × | × | ○ | × | × | × | ○ | ○ | × | × | × |
|   | N | × | ○ | × | × | × | × | × | × | × | ○ | × | × | × |
| D | 1 st | × | ○ | △ | ○ | × | × | × | × | (○) | ○ | × | ○ | ○ |
|   | 2 nd | ○ | ○ | △ | ○ | × | × | ○ | ○ | × | ○ | ○ | × | ○ |
|   | 3 rd | ○ | × | × | ○ | × | ○ | ○ | ○ | × | × | ○ | × | × |
|   | 4 th | × | × | × | ○ | ○ | ○ | × | ○ | × | × | × | × | × |

CONTROL SYSTEM FOR AUTOMATIC TRANSMISSION

BACKGROUND OF THE INVENTION

1. Field of the Invention

The present invention relates to a control system for an automatic transmission.

2. Related Art

The automatic transmission of the prior art is equipped with a torque converter, acting as a fluid coupling for receiving the rotation generated by an engine, and a gear-change mechanism for changing the speed of the rotation transmitted from the torque converter. The gear-change mechanism is equipped with a planetary gear unit composed of a plurality of gear elements for effecting shifting in accordance with a shift pattern which is preset to correspond to the vehicle speed, the throttle opening and so on.

The conventional automatic transmission allows for selection of a (parking) P-range, a (reverse) R-range, a (neutral) N-range, a (drive) D-range, a (second) S-range, a (low) L-range and so on. If the N-range is switched to the D-range by operation of the shift lever, for example, the rotation of the engine in the idling state is transmitted through the torque converter to the gear-change mechanism, to cause the vehicle to advance little by little without any depression of the accelerator pedal, i.e. the so-called "creep phenomenon".

In case, therefore, it is detected that a range such as the D-range, the S-range or the L-range (hereinafter a "forward range") for running the vehicle forward has been selected, that the accelerator pedal has been released, that the brake pedal is depressed and that the vehicle speed is substantially "0", the forward clutch which is applied in forward running of the vehicle, i.e. in a forward range, (hereinafter "first clutch") is brought into slipping engagement to establish a pseudo-neutral state so that the aforementioned creep phenomenon may be prevented. The pseudo-neutral state is intended to reduce vibration and improve fuel economy.

In this pseudo-neutral state (hereinafter "neutral control state"), it is possible, when the accelerator pedal is depressed, to reapply the first clutch, for example, to prevent the delay due to stroke loss of the piston within the servo which operates the first clutch piston, to prevent racing of the engine, and to prevent shock of engagement.

When the first clutch is to be released, moreover, by first abruptly reducing the oil pressure to the hydraulic servo of the first clutch immediately before the first clutch starts its release and subsequently, by gently reducing that oil pressure, the releasing shock is suppressed, and the releasing time period is shortened, while retaining the effects of reducing the vibration and improving the fuel economy to the maximum (as disclosed in Japanese Patent Application Laid-Open No. 79562/1993).

However, in the above-described system, because the oil pressure of the hydraulic servo of the first clutch is always reduced to the same set value, release shock may occur, or the effects of vibration reduction or improvement in the fuel economy may not be retained to the maximum.

If the starting conditions for the neutral control state are satisfied at the time of a fast idling or at the time of driving an accessory such as the air conditioner, for example, the oil pressure of the hydraulic servo of the first clutch is abruptly lowered to the aforementioned set value. However, at the time of the fast idling or at the time of driving an accessory such as the air conditioner, the idling R.P.M., i.e., the engine R.P.M., will rise to augment the input torque. As a result, by always lowering the oil pressure to the same set value, the first clutch may not restore to its state immediately before release, so that the next release is abrupt and accompanied by shock.

FIG. 20 is a first time chart illustrating the control system of an automatic transmission of the prior art, and FIG. 21 is a second time chart illustrating the control system of an automatic transmission of the prior art. In FIGS. 20 and 21 $N_E$ designates engine R.P.M., $T_0$ designates output torque, $P_{C1}$ designates C-1 oil pressure; $N_{C1}$ designates the input side R.P.M. of the first clutch; and $T_{C1}$ designates the torque capacity of the first clutch. This torque capacity $T_{C1}$ changes to correspond to the C-1 oil pressure $P_{C1}$.

FIG. 20 illustrates the case in which engine R.P.M. $N_E$ rises by a predetermined amount from the engine R.P.M. $N_E'$ in an ordinary idling state due to operation of an accessory. In such a case, if the starting conditions for the neutral control state are satisfied at time A, the C-1 oil pressure $P_{C1}$ is abruptly lowered. Since, however, the aforementioned set value is set with reference to the ordinary idling state, the input torque $T_E$ exceeds the torque capacity $T_{C1}$, and the input side R.P.M. $N_{C1}$ of the first clutch undergoes a steeper rise than an ordinary value $N_{C1}'$ so that the first clutch is abruptly released. As a result, the output torque $T_0$ fluctuates to the extent of causing releasing shock.

If, moreover, the starting conditions for the pseudo-neutral state are satisfied when the engine R.P.M. $N_E$ is lowered at idle by some cause, the oil pressure of the hydraulic servo of the first clutch is abruptly lowered to the aforementioned set value. Since, however, the input torque $T_E$ decreases according to the decrease of the engine R.P.M. $N_E$, the first clutch cannot be restored to its proper position for initiation of release and, therefore, the releasing time period is shortened so that the effects of vibration reduction and improvement in fuel economy cannot be realized to the maximum.

Likewise, if the accelerator pedal is released at stalling (or vehicle starting) and if the starting conditions for the pseudo-neutral state are satisfied at point A, as illustrated in FIG. 21, the C-1 oil pressure $P_{C1}$ is abruptly reduced. However, because the engine R.P.M. $N_E$ rises upon stalling and the input torque $T_E$ increases, the first clutch cannot be restored to its proper position for initiation of release, as in the case of FIG. 20, so that the output torque $T_0$ seriously fluctuates. After this, the engine R.P.M. $N_E$ is gradually lowered as the accelerator is released, and the input torque $T_E$ accordingly becomes lower than the torque capacity $T_{C1}$ so that the first clutch engages at point B and, again, the output torque $T_0$ fluctuates to the extent of causing releasing shock.

SUMMARY OF THE INVENTION

An object of the present invention is to solve the aforementioned problems of the control system for an automatic transmission of the prior art and to provide a control system for an automatic transmission, which always avoids any occurrence of releasing shock, even in the case where the starting conditions for the neutral control state are satisfied and the engine RPM drops to shorten the time period for release, thereby reducing vibration and improving fuel economy to the maximum.

According to one aspect of the present invention, therefore, there is provided a control system for an automatic transmission in a vehicle drive train including an engine and a fluid coupling for transmitting the rotation of an engine to the transmission, the transmission having a clutch which is applied responsive to selection of a forward running range ("first clutch" as previously defined) and a hydraulic servo which receives oil pressure for applying the clutch. The control system includes a control unit for controlling the oil pressure to the hydraulic servo; an input torque detector means for detecting torque input to the transmission; and specific state detecting means for detecting a specific set of conditions, including means for detection of selection of a forward running range, means for detecting that the vehicle is stopped and means for detecting that the engine is in an idling state.

The control unit for the control system controls the torque input to the transmission to instantaneously correspond to the aforementioned detected conditions and includes: first pressure-reducing means for abruptly reducing the oil pressure of the hydraulic servo to a set oil pressure immediately before the release of the clutch is started; and second pressure-reducing means for gradually further reducing the oil pressure of the hydraulic servo, below the set oil pressure by the first pressure-reducing means, to release the clutch.

According to another aspect of the present invention, the control system further includes: input torque change deciding means for deciding whether or not the input torque has changed during the reduction of the oil pressure by the second pressure-reducing means; and oil pressure changing means for lowering the oil pressure of the hydraulic servo, when it is decided that the input torque has changed, from the oil pressure (corresponding to input torque) at the time of the decision of change in the input torque. The extent to which the oil pressure is lowered by the oil pressure changing means corresponds to the reduction in oil pressure the second pressure-reducing means would have produced during the time period from the instant the first pressure-reducing means set the oil pressure of the hydraulic servo to the instant when the input torque change deciding means decided that the input torque had changed.

If the oil pressure is changed by the oil pressure changing means, the second pressure-reducing means gradually reduces that new oil pressure established by the oil pressure changing means.

If, in the above case, the accelerator pedal is released from its depressed state with the brake pedal being depressed, for example, the specific conditions are detected as being satisfied to start the release of the clutch.

As the accelerator pedal is released, moreover, the input torque is reduced. If, however, the input torque change deciding means decides that the input torque has changed, the oil pressure changing means changes the oil pressure to an oil pressure which is lower than the set oil pressure corresponding to the input torque at the time of the change in the input torque, by such an oil pressure as is to be reduced by the second pressure-reducing means during that time period from the instant when the first pressure-reducing means reduced the oil pressure of the hydraulic servo to the set oil pressure to the instant when the input torque change deciding means decided that the input torque had changed. As a result, the oil pressure of the hydraulic servo is reduced as the input torque decreases, so that time period required for release of the clutch can be minimized to retain the effects of vibration reduction and improve fuel economy.

Even if the idling rate increases, moreover, the time period for release of the clutch remains constant and the releasing characteristics of the clutch remain stable.

The first pressure-reducing means sets the oil pressure to the clutch, in a manner to correspond to the input torque at the instant when the aforementioned specific set of conditions is satisfied, by an abrupt reduction of the oil pressure of the hydraulic servo. As a result, even if the engine R.P.M. rises to augment the input torque at the time of fast idling or for driving an accessory such as the air conditioner, for example, it is possible to restore the hydraulic servo to the state where it was immediately before the clutch was released. As a result, the release of the clutch is not abruptly started so that the releasing shock can be prevented.

Even if, on the other hand, the input torque is reduced when the engine R.P.M. is lowered by some cause, it is possible to restore the hydraulic servo to its proper state (position) for initiation of clutch application. As a result, the time period required for clutch releasing is minimized to improve fuel economy.

BRIEF DESCRIPTION OF THE DRAWINGS

FIG. 3 is a chart of operations of the automatic transmission under control of the control system of FIG. 1;

DESCRIPTION OF THE PREFERRED EMBODIMENT

An embodiment of the present invention will now be described in detail with reference to the accompanying drawings.

Figure 1:
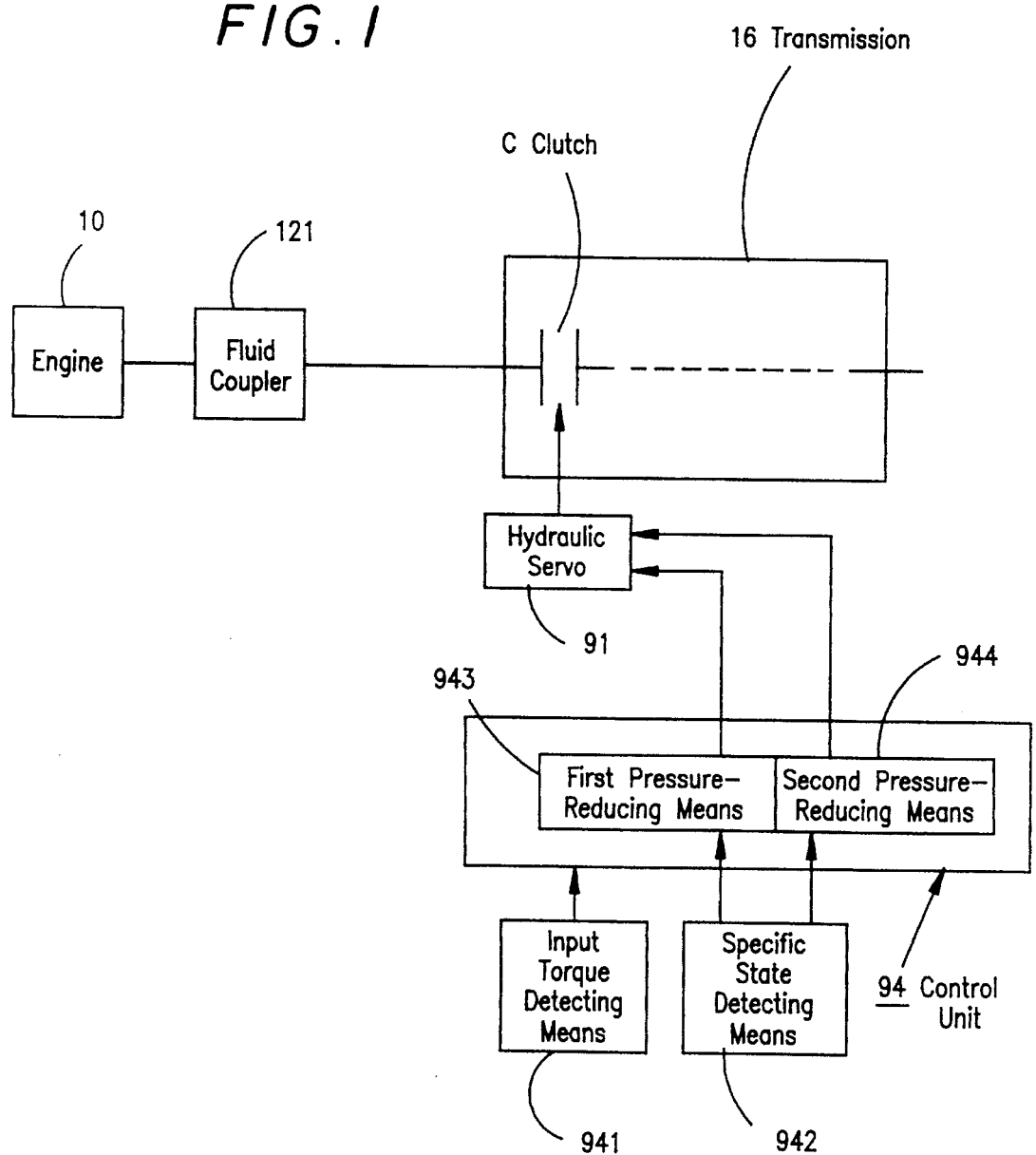
FIG. 1 is a block diagram showing an embodiment of an automatic transmission control system according to the present invention.

As shown in FIG. 1, the automatic transmission includes a fluid coupling 121 for transmitting the rotation of an engine 10 to a gear-change mechanism 16; a clutch C which is applied when a forward range is selected ("first clutch"); a hydraulic servo 91 for applying the clutch C; a control unit 94 for controlling the oil pressure to the hydraulic servo 91; input torque detecting means 941 for detecting input torque to the transmission 16; and specific state detecting means 942 for detecting a specific set of conditions including selection of a forward range, the vehicle being stopped and the engine idling.

The control unit 94 includes first pressure-reducing means 943 for abruptly reducing the oil pressure of the hydraulic servo 91 to a set oil pressure immediately prior to initiation of release of the clutch C, the set oil pressure corresponding to the input torque at the instant in time when satisfaction of the specific set of conditions is detected by the specific state detecting means 942; and second pressure-reducing means 944 for gradually further reducing the oil pressure to the hydraulic servo 91 to release the clutch C.

Figure 2:
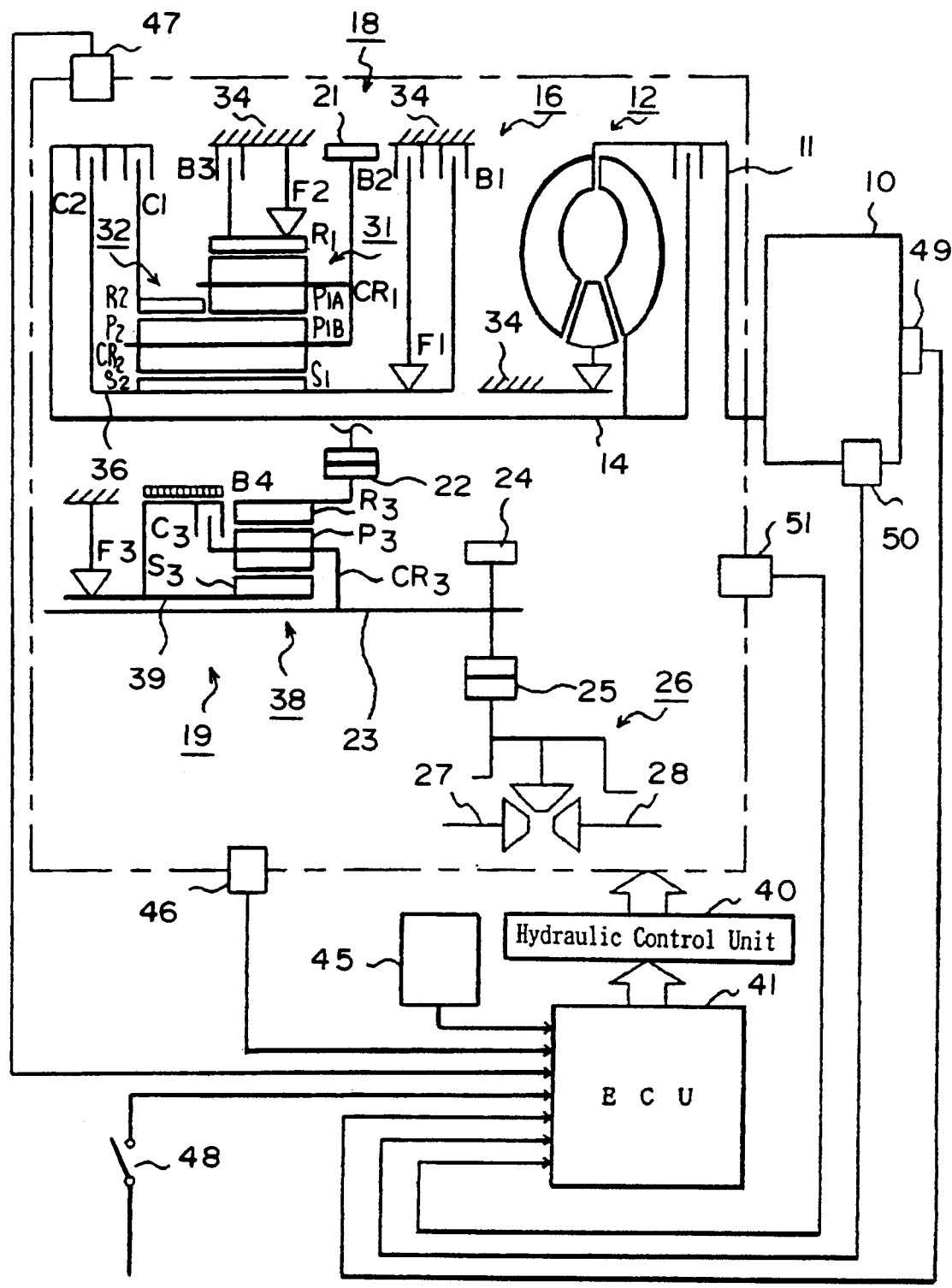
FIG. 2 is a schematic diagram of the control system of FIG. 1 and the automatic transmission thereby controlled.

As shown in FIG. 2, the rotation generated by the engine 10 is transmitted through an output shaft 11 to a torque converter 12 acting as the fluid coupling 121 (of FIG. 1). This torque converter 12 transmits the rotation of the engine 10 through a working fluid to an output shaft 14 but is also able to transmit the rotation of the engine 10 directly to the output shaft 14 by a lockup clutch L/C which is applied when the vehicle speed exceeds a set value.

The output shaft 14 transmits rotation to the transmission of gear-change mechanism 16 for establishing any one of four forward speeds and one reverse speed. This transmission 16 is composed of a main transmission 18 for establishing three forward and one reverse speeds, and an auxiliary transmission 19 of the under-drive type. Thus, the rotation of the main transmission 18 is transmitted through a counter drive gear 21 and a counter driven gear 22 to the auxiliary transmission 19, the output shaft 23 of which has its rotation transmitted through an output gear 24 and a ring gear 25 to a differential unit 26.

In the differential unit 26, the rotation received through the output gear 24 and the ring gear 25 are differentiated so that the two individual rotational speeds are transmitted to the drive wheels (not shown) through left-hand and right-hand drive shafts 27 and 28.

The main transmission 18 is equipped, not only with a first planetary gear unit 31 and a second planetary gear unit 32, but also with a first clutch C1, a second clutch C2, a first brake B1, a second brake B2, a third brake B3, a first one-way clutch F1 and a second one-way clutch F2, all for selectively transmitting torque between the individual elements of the two planetary gear units 31 and 32. Incidentally, the first clutch C1 corresponds to the clutch C of FIG. 1.

The first planetary gear unit 31 has a ring gear $R_1$ connected to a drive unit casing 34 through the third brake B3 and the second one-way clutch F2 which are juxtaposed to each other. A sun gear $S_1$ is formed on a sun gear shaft 36 which is fitted on and rotatably supported by the output shaft 14. A carrier $CR_1$ is connected to the counter drive gear 21; and pinions $P_{1A}$ and $P_{1B}$, meshing between the ring gear $R_1$ and the sun gear $S_1$, are rotatably supported by the carrier $CR_1$.

The aforementioned sun gear shaft 36 is connected through the second clutch C2 to the output shaft 14. Moreover, the sun gear shaft 36 is connected to the drive unit casing 34 (1) through the first brake B1 and (2) through the first one-way clutch F1 and the second brake B2 which are juxtaposed to each other.

On the other hand, the second planetary gear unit 32 has a ring gear $R_2$ connected through a first clutch C1 to the output shaft 14. A sun gear $S_2$ is formed on the sun gear shaft 36 integrally with the sun gear $S_1$. A carrier $CR_2$ is connected to the carrier $CR_1$ and a pinion $P_2$, meshing between the ring gear $R_2$ and the sun gear $S_2$, is rotatably supported by the carrier $CR_2$ and formed integrally with the pinion $P_{1B}$.

The aforementioned counter drive gear 21 is meshed with the counter driven gear 22, which is arranged in the auxiliary transmission 19, to transmit the rotation, at a speed set by the main transmission 18, to the auxiliary transmission 19.

The auxiliary transmission 19 has a third planetary gear unit 38. A third clutch C3, a fourth brake B4 and a third one-way clutch F3 serve to selectively transmit torque between the individual elements of the third planetary gear unit 38.

The third planetary gear unit 38 has a ring gear $R_3$ connected to the counter driven gear 22; a sun gear $S_3$ is formed on a sun gear shaft 39 which is rotatably fitted on the output shaft 23; a carrier $CR_3$ is fixed on the output shaft 23 and a pinion $P_3$, meshing between the ring gear $R_3$ and the sun gear $S_3$, is rotatably supported by the carrier $CR_3$.

Operations of the above-described automatic transmission will now be described with reference to FIG. 3. In FIG. 3, $S_1$ is a first solenoid valve, $S_2$ is a second solenoid valve, $S_3$ is a third solenoid valve, C1 is the first clutch, C2 is the second clutch, C3 is the third clutch, B1 is the first brake, B2 is the second brake, B3 is the third brake, B4 is the fourth brake, F1 is the first one-way clutch, F2 is the second one-way clutch, and F3 is the third one-way clutch. Further, R represents R-range, N is N-range, D is D-range, 1ST is a 1st speed gear stage, 2ND is a 2nd speed gear stage, 3RD is a 3rd speed gear stage, and 4TH is a 4th speed gear stage.

Further, in FIG. 3, symbol O indicates that the first solenoid valve $S_1$, the second solenoid valve $S_2$ and the third solenoid valve $S_3$ are ON, that the first clutch C1, the second clutch C2, the third clutch C3, the first brake B1, the second brake B2, the third brake B3 and the fourth brake B4 are applied, and that the first one-way clutch F1, the second one-way clutch F2 and the third one-way clutch F3 are locked. On the other hand, symbol X indicates that the first solenoid valve $S_1$, the second solenoid valve $S_2$ and the third solenoid valve $S_3$ are OFF, that the first clutch C1, the second clutch C2, the third clutch C3, the first brake B1, the second brake B2, the third brake B3 and the fourth brake B4 are released, and that the first one-way clutch F1, the second one-way clutch F2 and the third one-way clutch F3 are free.

Incidentally, symbol Δ indicates an element turned ON/OFF when a neutral control state is established, and symbol (O) indicates that the element is applied for engine braking.

At the 1st speed in the D-range, the first clutch C1 and the fourth brake B4 are applied, and the second one-way clutch F2 and the third one-way clutch F3 are locked. Then, the rotation of the input shaft 14 is transmitted through the first clutch C1 to the ring gear R2. Since, in this state, the rotation of the ring gear $R_1$ is blocked by the second one-way clutch F2, the rotation of the carrier $CR_2$ is drastically decelerated, while idly rotating the sun gear $S_2$, and is transmitted to the counter drive gear 21.

The rotation transmitted from the counter drive gear 21 to the counter driven gear 22 is transmitted to the ring gear $R_3$. However, since the rotation of the sun gear $S_3$ is blocked by the fourth brake B4, the rotation of the carrier $CR_3$ is further decelerated and is transmitted to the output shaft 23.

At the 2nd speed in the D-range, on the other hand, the first clutch C1, the first brake B1, the second brake B2 and the fourth brake B4 are applied, and the first one-way clutch F1 and the third one-way clutch F3 are locked. Then, the rotation of the input shaft 14 is transmitted through the first clutch C1 to the ring gear R2, but the rotation of the sun gear $S_2$ is blocked by the second brake B2 and the first one-way clutch F1. As a result, the rotation of the ring gear $R_2$ is decelerated and transmitted to the carrier $CR_2$, the rotation of which is transmitted to the counter drive gear 21 while idly rotating the ring gear $R_1$.

The rotation transmitted from the counter drive gear 21 to the counter driven gear 22 is transmitted to the ring gear $R_3$. Since, however, the rotation of the sun gear $S_3$ is blocked by the fourth brake B4, the rotation of the carrier $CR_3$ is decelerated and transmitted to the output shaft 23.

At the 3rd speed in the D-range, the first clutch C1, the third clutch C3, the first brake B1 and the second brake B2 are applied, and the first one-way clutch F1 is locked. Then, the rotation of the input shaft 14 is transmitted through the first clutch C1 to the ring gear $R_2$, and the rotation of the sun gear $S_2$ is blocked by the second brake B2 and the first one-way clutch F1. As a result, the rotation of the ring gear $R_2$ is decelerated and transmitted to the carrier $CR_2$, the rotation of which is transmitted to the counter drive gear 21 while idly rotating the ring gear $R_1$.

The rotation transmitted from the counter drive gear 21 to the counter driven gear 22 is transmitted to the ring gear $R_3$. Since, however, relative rotation between the carrier $CR_3$ and the sun gear $S_3$ is blocked by the third clutch C3, the third planetary gear unit 38 comes into its directly connected state. As a result, the rotation of the counter driven gear 22 is transmitted as is to the output shaft 23.

At the 4th speed in the D-range, the first clutch C1, the second clutch C2, the third clutch C3 and the second brake B2 are applied. Then, the rotation of the input shaft 14 is transmitted through the first clutch C1 to the ring gear $R_2$ and through the second clutch C2 to the sun gear $S_2$ so that the first and second planetary gear units 31 and 32 come into their directly connected states. As a result, the rotation of the output shaft 11 is transmitted as is to the counter drive gear 21.

The rotation transmitted from the counter drive gear 21 to the counter driven gear 22 is transmitted to the ring gear $R_3$. Since, however, the relative rotation between the carrier $CR_3$ and the sun gear $S_3$ is blocked by the third clutch C3, the third planetary gear unit 38 comes into its directly connected state. As a result, the rotation of the counter driven gear 22 is transmitted as is to the output shaft 23.

The above-described automatic transmission is provided with a hydraulic circuit (not shown) for applying/releasing the first clutch C1, the second clutch C2, the third clutch C3, the first brake B1, the second brake B2, the third brake B3 and the fourth brake B4, and this hydraulic circuit, in turn, is controlled by hydraulic control circuit 40. This hydraulic control circuit 40 is connected with a controller (i.e., ECU) 41 so that it is controlled according to the control program of the controller 41.

The controller 41 receives signals from a neutral start switch (i.e., N.S.S.W.) 45, an oil temperature sensor 46, an R.P.M. sensor 47, a brake switch 48, an engine R.P.M. sensor 49 acting as the input torque detecting means 941, a throttle opening sensor 50 and a vehicle speed sensor 51.

Thus, the shift position of the shift lever (not shown), i.e., the selected range, is detected by the neutral start switch 45; the temperature of the oil in the hydraulic circuit is detected by the oil temperature sensor 46; and the R.P.M. of the input side of the first clutch C1, i.e., the R.P.M. $N_{C_1}$ of the output shaft 14 (hereinafter "clutch input side R.P.M.") is detected by the R.P.M. sensor 47.

Moreover, depression of the brake pedal (not shown) is detected by the brake switch 48; the engine R.P.M. $N_E$ is detected by the engine R.P.M. sensor 49; the throttle opening θ is detected by the throttle opening sensor 50; and the vehicle speed is detected by the vehicle speed sensor 51.

Figure 4:
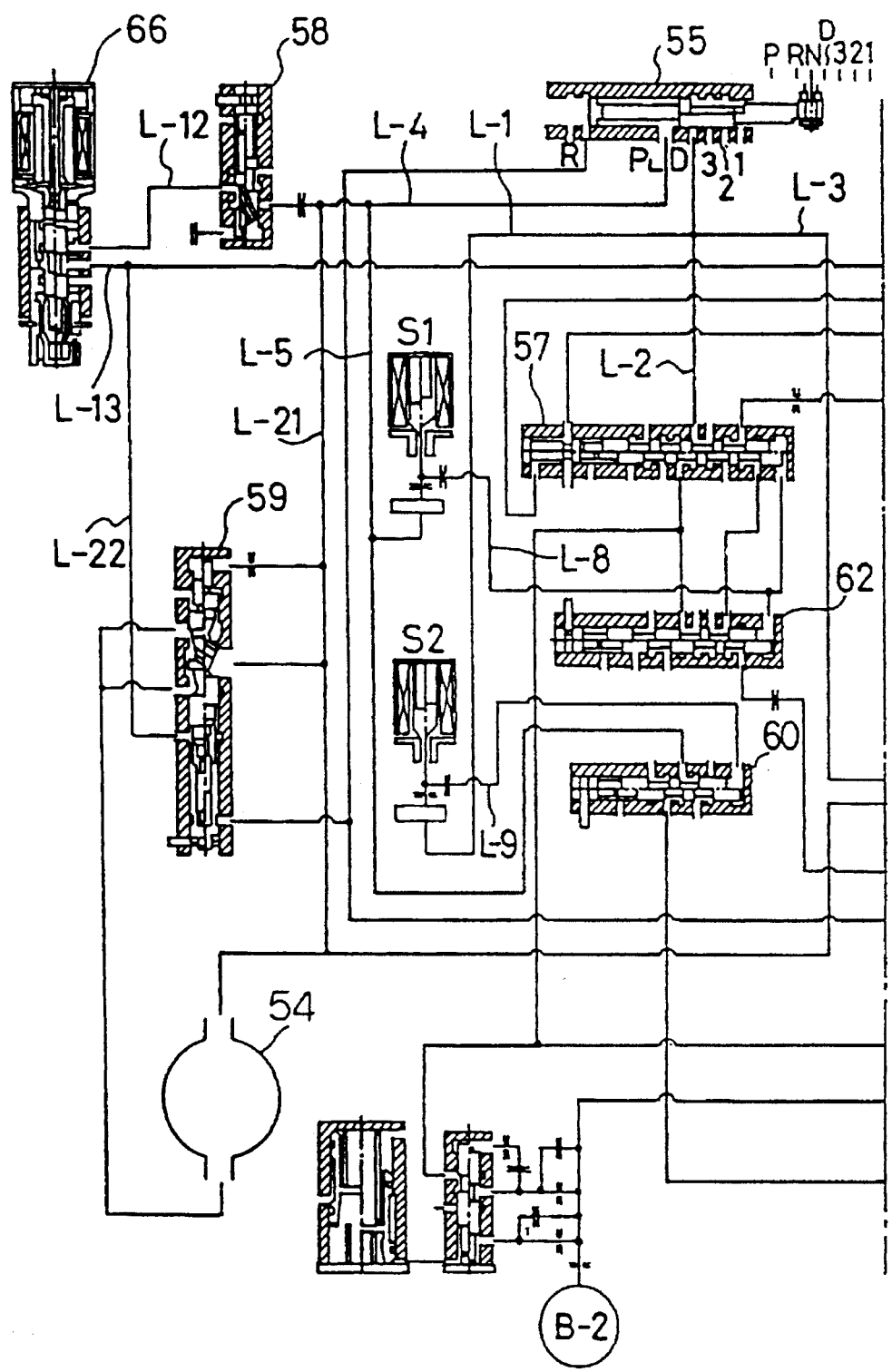
FIGS. 4 and 5 show a hydraulic control circuit for the control system of FIG. 1.
Figure 5:
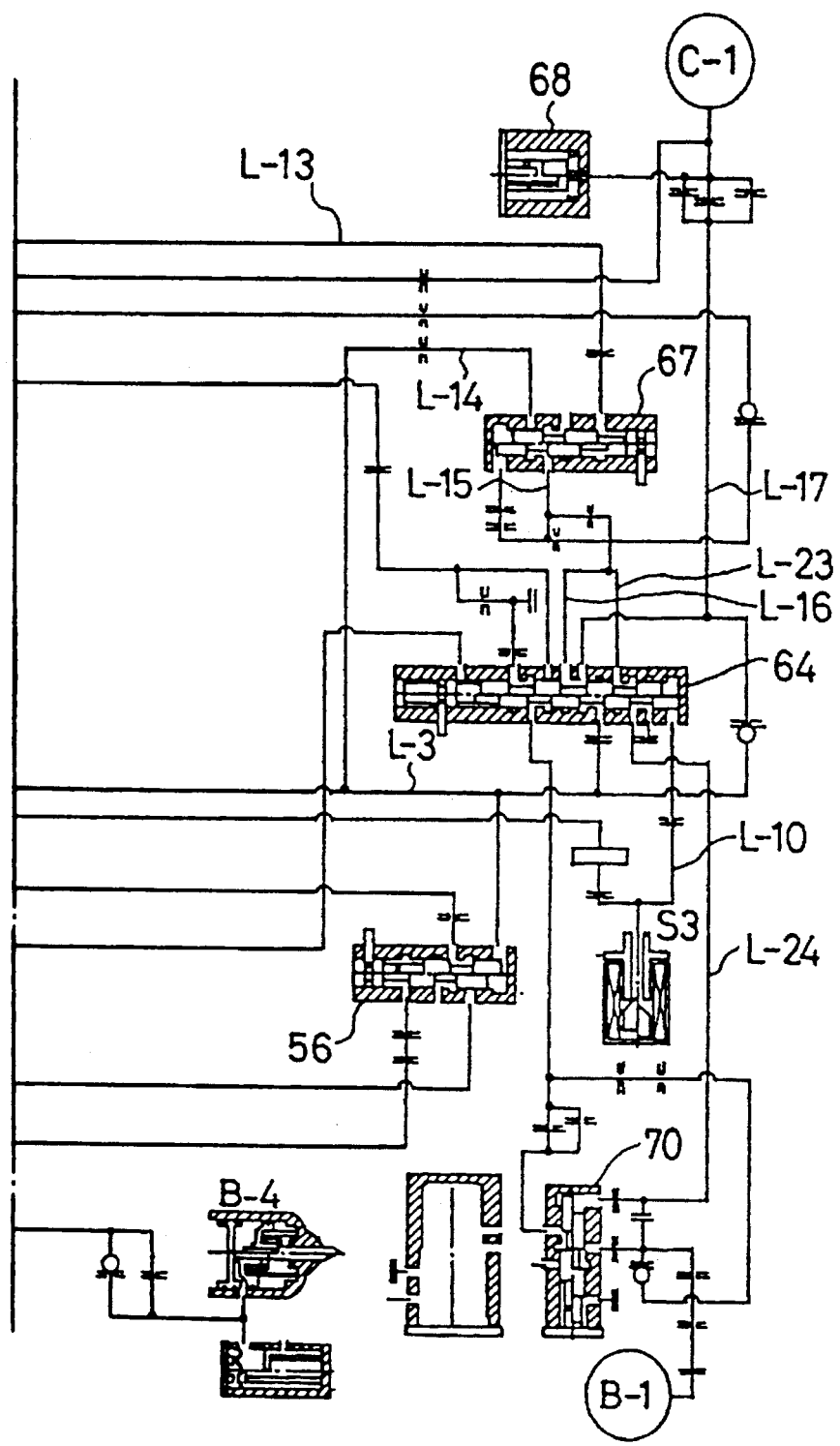

FIGS. 4 and 5 illustrate a hydraulic circuit suitable for use in the present invention, which circuit includes a primary valve 59 that regulates the oil pressure coming from an oil pressure source 54 and outputs it as a line pressure to an oil passage L-21. Manual valve 55 is provided with ports 1, 2, 3, D, PL and R. The line pressure fed from the primary valve 59 to the port $P_L$, via the oil passage L-21 and an oil passage L-4, is established as the 1st-range pressure, the 2nd-range pressure, the 3rd-range pressure, the D-range or forward-range pressure and the R-range pressure at the ports 1, 2, 3, D and R, respectively, by operation of the shift lever (not shown).

When the shift lever is shifted to the forward drive position, the D-range pressure oil is fed via an oil passage L-1 to the second solenoid valve $S_2$, via an oil passage L-2 to a 1–2 shift valve 57, and via an oil passage L-3 to a B-1 sequence valve 56. On the other hand, the line pressure from the primary valve 59 is fed via the oil passage L-21 to the third solenoid valve S3.

Moreover, the line pressure from the oil passage L-21 is fed via the oil passage L-4 to a solenoid modulator valve 58 and further via an oil passage L-5 to the first solenoid valve $S_1$ and a 2–3 shift valve 60.

The first solenoid valve S1, the second solenoid valve S2 and the third solenoid valve S3 are turned ON/OFF in response to the signals of the hydraulic control circuit 40 (of FIG. 2) so that the first solenoid valve S1 feeds a signal oil pressure via an oil passage L-8 to the 1–2 shift valve 57 and a 3–4 shift valve 62, so that the second solenoid valve S2 feeds a signal oil pressure via an oil passage L-9 to the 2–3 shift valve 60, and so that the third solenoid valve S3 feeds a signal oil pressure via an oil passage L-10 to a neutral relay valve 64.

The spool of the 1–2 shift valve 57 takes the upper half position shown in FIG. 4 in the 1st speed and the lower half position in the 2nd, 3rd and 4th speeds. The spool of the 2–3 shift valve 60 takes the lower half position shown in FIG. 4 in the 1st and 2nd speeds and the upper half position in the 3rd and 4th speeds. The spool of the 3–4 shift valve 62 takes the upper half position shown in the drawings in the 1st and 4th speeds and the lower half position in the 2nd and 3rd speeds. The spool of the neutral relay valve 64 takes the upper half position shown in FIG. 5 in the neutral control state and the lower half position in the 1st to 4th speeds.

The solenoid modulator valve 58 is connected via an oil passage L-12 with a linear solenoid valve 66, which, in turn, is connected via an oil passage L-13 with a C-1 control valve 67. The linear solenoid valve is further connected via an oil passage L-22 with the primary valve 59.

In response to a signal from the hydraulic control circuit 40, the linear solenoid valve 66 feeds a throttle pressure $P_{TH}$ as the control oil pressure to the C-1 control valve 67. This C-1 control valve 67 is fed with the D-range pressure the via oil passages L-3 and L-14 and regulates the D-range pressure to provide a pressure $P_{C1}$ (hereinafter "C-1 oil pressure") to hydraulic servo C-1 via oil passage L-15. Thus, the C-1 oil pressure $P_{C1}$ corresponds to the throttle pressure $P_{TH}$ coming from the linear solenoid valve 66.

The aforementioned neutral relay valve 64 takes the upper half position in the neutral control state. In this neutral control state, therefore, the C-1 oil pressure $P_{C1}$ established in the oil passage L-15 is fed via an oil passage L-16, the neutral relay valve 64 and an oil passage L-17 to the hydraulic servo C-1. The C-1 oil pressure $P_{C1}$ is further fed via oil passages L-23 and L-24 to a B-1 control valve 70.

The neutral relay valve 64 normally takes the lower half position in the 1st to 4th speeds. As a result, in the 1st to 4th speeds, the D-range pressure oil is fed via the oil passage L-3, the neutral relay valve 64 and the oil passage L-17 to the hydraulic servo C-1. In the neutral control state, moreover, the neutral relay valve 64 is switched to its upper half position to connect the oil passage L-16 and the oil passage L-17.

A damper valve 68 is provided in the oil passage L-17 for smoothing the discharge of oil from the hydraulic servo C-1.

B-1, B-2 and B-3 designate hydraulic servos for the first brake B1, the second brake B2 and the third brake B3, respectively.

Figure 6:
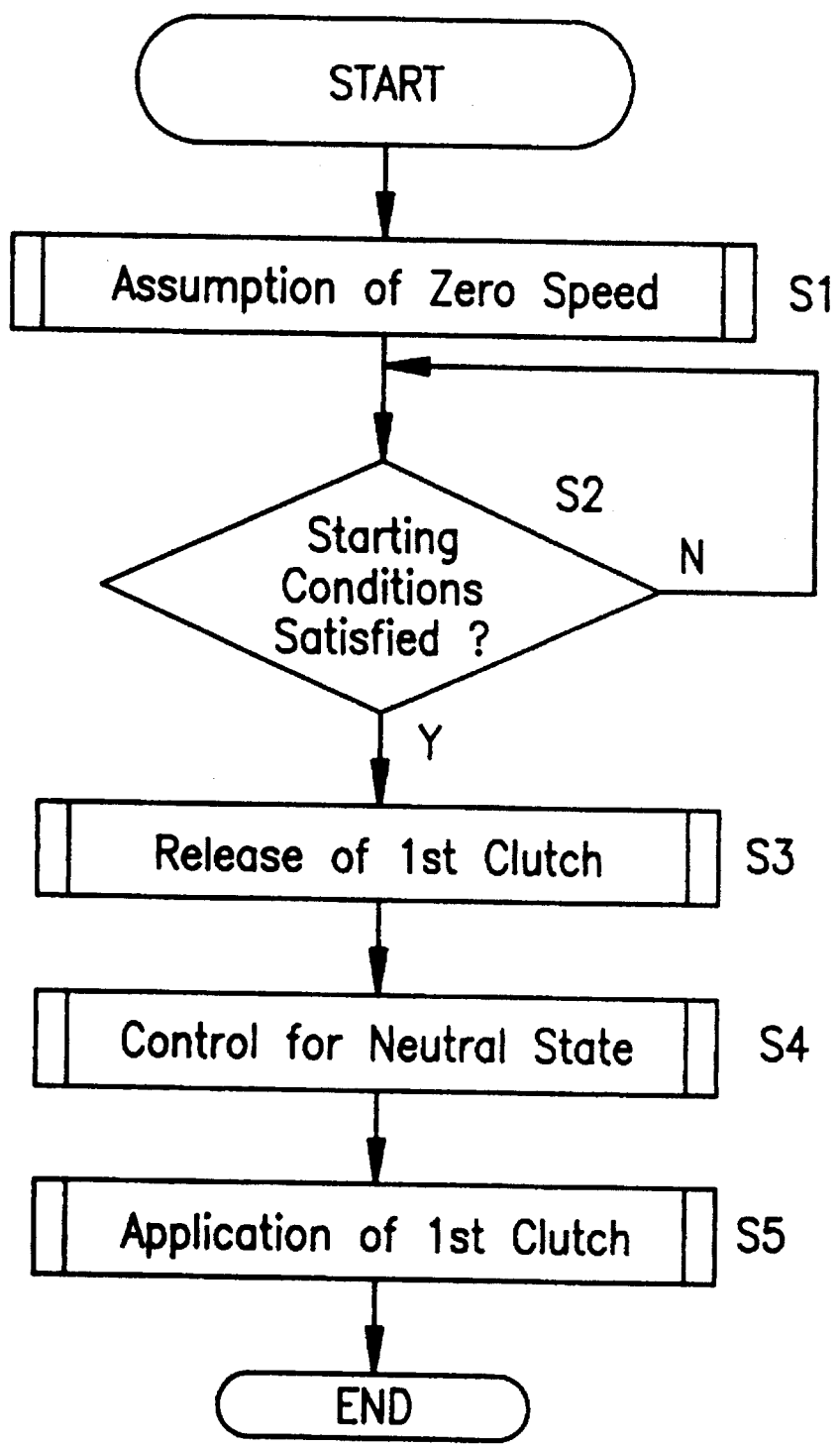
FIG. 6 is a flow chart of the main process control routine utilized in the control system of FIG. 1.

The flow chart for the main process routine of the control system is shown in FIG. 6 and includes the following steps:

Step S1 : It is assumed on the basis of a change in the clutch input side R.P.M. $N_{C1}$ that the vehicle speed is zero.

Step S2 : When the vehicle is brought to a stop by releasing the accelerator pedal (not shown) and by depressing the brake pedal (not shown), the processing routine awaits satisfaction of a specific set of conditions for starting the neutral control state. If the answer to inquiry as to satisfaction of those conditions is YES, the routine advances to Step $S_3$.

In this step, the specific state detecting means decides if the starting conditions are satisfied. In other words, it detects if all of the following individual conditions are satisfied: that the zero assumption of the vehicle speed is ended; that the throttle opening θ is no more than a predetermined value; that the oil temperature detected by the oil temperature sensor 46 is no less than a predetermined value; and that the brake switch 48 is ON.

Step S3 : The first clutch is released by the first pressure-reducing means 943 (of FIG. 1) and the second pressure-reducing means 944. In this step, the C-1 oil pressure $P_{C1}$ is controlled to correspond to the throttle pressure $P_{TH}$ which is set according to the engine R.P.M. $N_E$ which, in turn, corresponds to the input torque. After this, the C-1 oil pressure $P_{C1}$ is reduced by a set increment of pressure.

The input torque can be detected not only as a function of the engine R.P.M. $N_E$ but also indirectly by the air suction rate of the engine, the fuel injection rate and so on. Moreover, the input torque of the transmission 16 can also be directly detected by the torque sensor. Incidentally, this torque sensor is attached to the output shaft 14 of the torque converter 12 (of FIG. 2).

Step S4: The neutral control state is established. In step S4, the routine awaits until the engine R.P.M. $N_E$ and the clutch input side R.P.M. $N_{C1}$ are stabilized. After this stabilization, the C-1 oil pressure $P_{C1}$ is controlled by raising or lowering it by a set increment of pressure on the basis of the engine R.P.M. $N_E$ and the clutch input side R.P.M. $N_{C1}$.

Step S5: The first clutch is applied. In this step, the C-1 oil pressure $P_{C1}$ is boosted by the set increment of pressure which is set on the basis of the throttle opening θ, the engine R.P.M. $N_E$ and so on, to end the piston stroke of the hydraulic servo C-1 (of FIG. 5). At the end of the piston stroke of the hydraulic servo C-1, the C-1 oil pressure $P_{C1}$ is further boosted by a set increment of pressure to prevent application shock.

Figure 7:
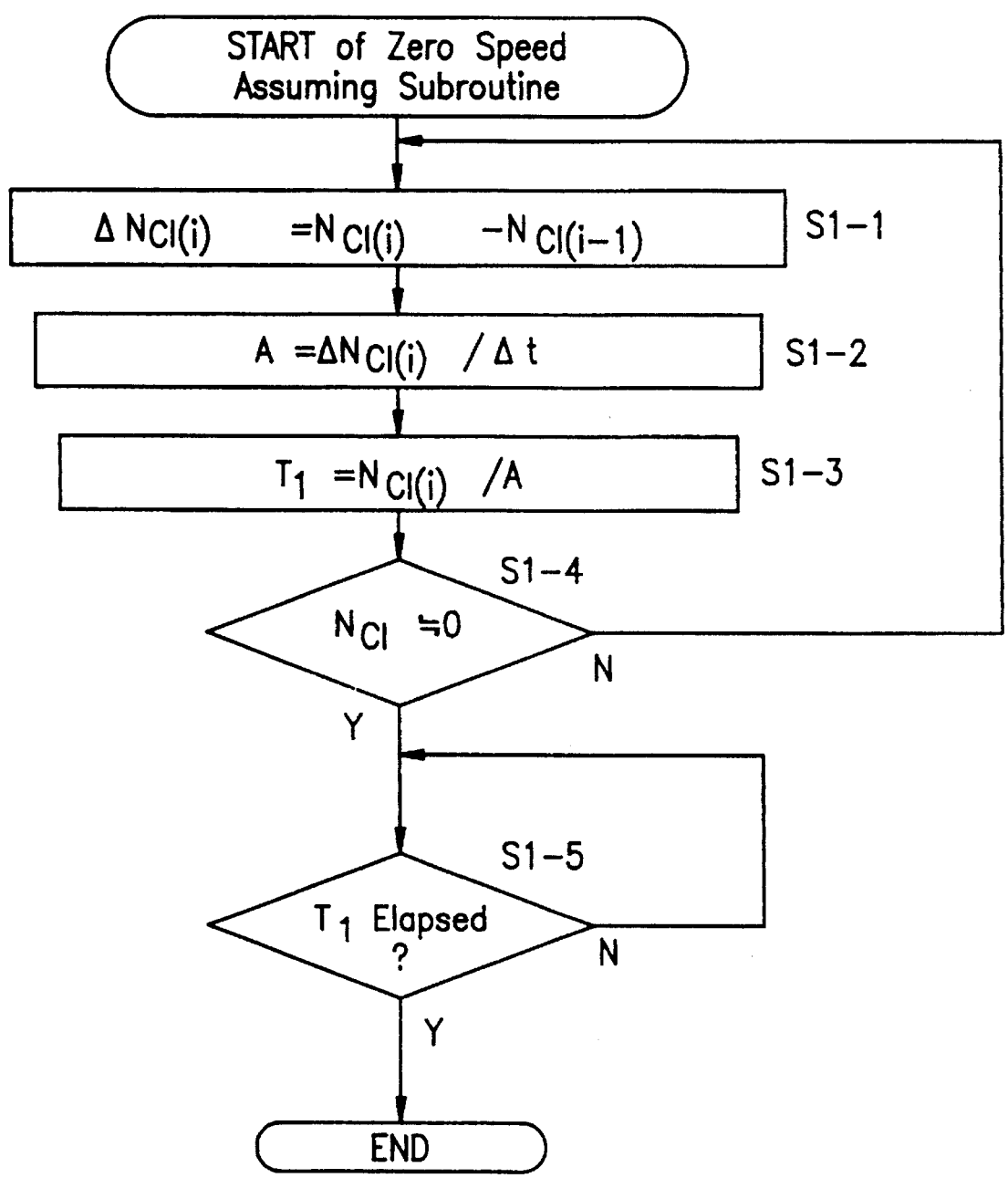
FIG. 7 is a flow chart of a zero vehicle speed assuming subroutine, i.e. for step S1 in the routine of FIG. 6.
Figure 8:
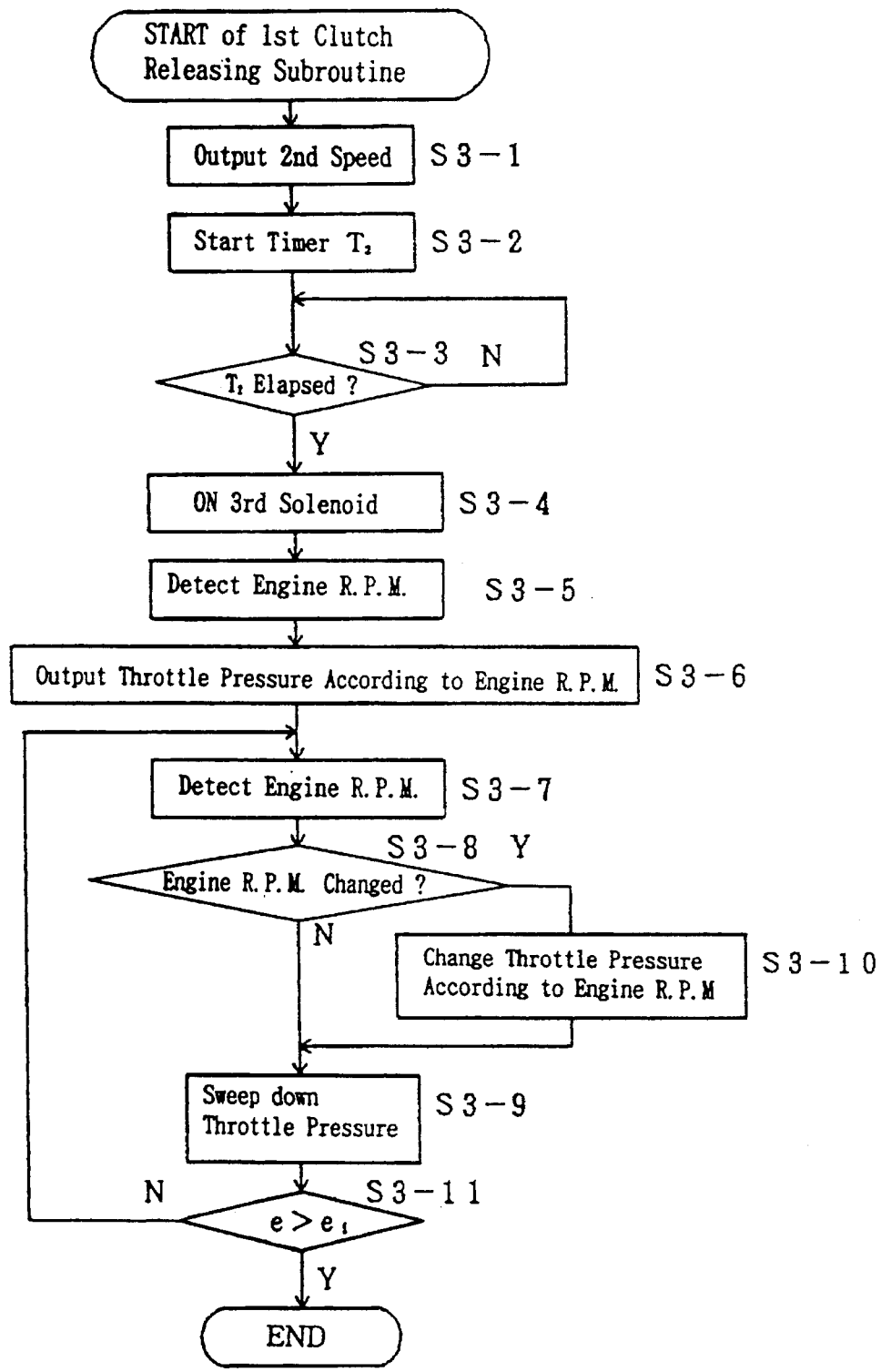
FIG. 8 is a flow chart of a 1st clutch releasing subroutine, i.e. for step S3 in the routine of FIG. 6.

The subroutine for zero speed assumption in Step S1 of FIG. 6 will now be described with reference to FIG. 7.

Step S1-1: An R.P.M. difference $\Delta N_{C1(i)}$ is calculated by subtracting a clutch input side R.P.M. $N_{C1(i-1)}$ at an instant preceding the present time by a period $\Delta t$, from a clutch input side R.P.M. $N_{C1(i)}$ at the present time. In this case, the time period $\Delta t$ is set by a clock in the aforementioned automatic transmission control system 41 so that the clutch input side R.P.M. $N_{C1}$ is detected at each time interval of Step S1-2: The deceleration A of the vehicle is calculated by dividing the R.P.M. difference $\Delta N_{C1(i)}$ by the time period $\Delta t$.

Step S1-3: The time period $T_1$ for the vehicle to come to a stop is calculated by dividing the clutch input side R.P.M. $N_{C1(i)}$ at the present time by the deceleration A.

Step S1-4: Processing stands by until the clutch input side R.P.M. $N_{C1(i)}$ at the present time becomes so low it cannot be measured. The subroutine advances to Step S1-5, if the answer is YES ($N_{C1(i)}$ cannot be measured), but returns to Step S1-1 if the answer is NO.

Step S1-5: Processing is delayed until the time period $T_1$ has elapsed, as determined by a timer (not shown). If this answer is YES ($T_1$ has elapsed), it is assumed that the vehicle speed is zero.

With reference to FIGS. 8 to 12, the first clutch releasing subroutine of Step S3 of FIG. 6 will now be described with reference to FIGS. 8–12.

Step S3-1: After the starting conditions are satisfied, the 2nd speed shifting output is issued to apply the first brake B1 (of FIG. 2) to thereby effect a hill-holding function.

Step S3-2: The timing of the time period T2 is started by the timer (not shown).

Figure 9:
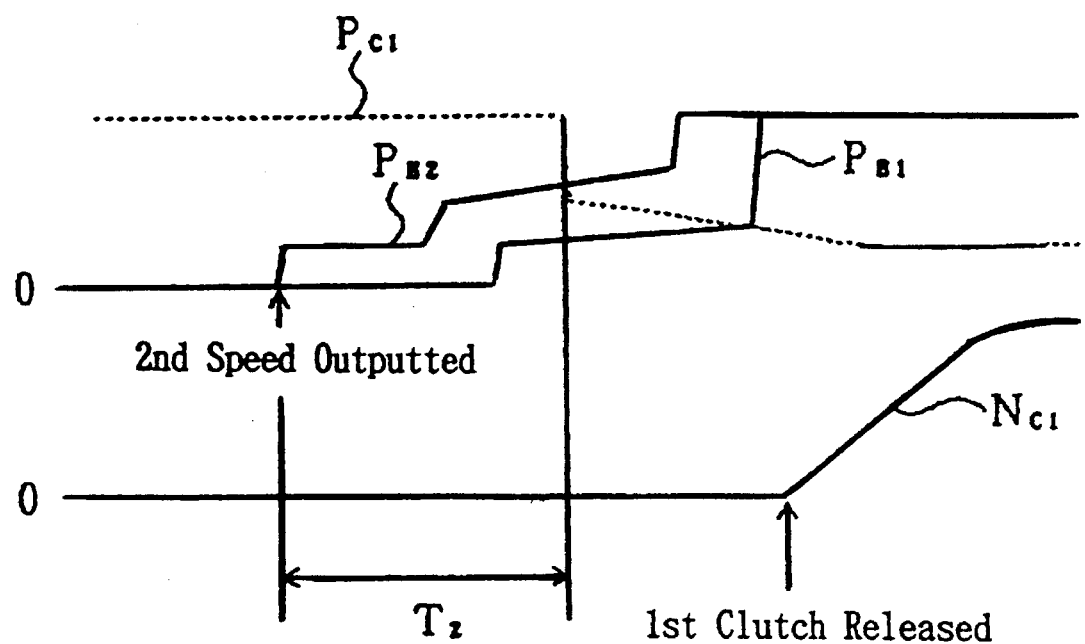
FIG. 9 is a time chart for a 2nd speed shift under control of the system of the present invention.

Step S3-3: The application of the first brake B1 is awaited by awaiting lapse of the time period $T_2$. This time period $T_2$ has its value set by considering the time lag required for the oil pressure of the hydraulic servo C-1 (of FIG. 5) to lower as illustrated in FIG. 9, and the time lag required for application of the hydraulic servo B-1. As a result, the first clutch C1 is released after the first brake B1 has been applied, so that the shock can be prevented following the shift, to thereby effect smooth entry into the neutral control state.

Step S3-4: A signal $S_3$ fed to the third solenoid valve S3 which is thereby turned ON to switch the neutral relay valve 64 to the upper half position in which the C-1 oil pressure $P_{C1}$ is controlled.

Step S3-5: As plotted in the graph of FIG. 11, the engine R.P.M. $N_E$ corresponding to the input torque $T_T$ is detected and set to a reference engine R.P.M. $N_{Em}$.

Step S3-6: On the basis of the graph of FIG. 11, the throttle pressure $P_{TH}$ is lowered to the set oil pressure $P_1$ immediately before the first clutch C1 starts to be released, according to the engine R.P.M. $N_E$, thereby lowering the C-1 oil pressure $P_{C1}$.

In this step S3-6, the set oil pressure $P_1$ is set to correspond to the engine R.P.M. $N_E$ at the instant when the aforementioned specific set of conditions is satisfied, and the C-1 oil pressure $P_{C1}$ is abruptly lowered to the set oil pressure $P_1$. Thus, even if the engine R.P.M. $N_E$ jumps because of a fast idle, for example, when an accessory such as the air conditioner is turned on, it is possible to establish the state immediately before the first clutch C1 is released, i.e. a position in readiness for release. As a result, the release of the first clutch C1 is not abruptly started and releasing shock is prevented.

Moreover, even if the engine R.P.M. $N_E$ rises, for example when the accelerator pedal is released at stalling, it is possible to establish the state immediately before the first clutch C1 is released. In this case, too, the release of the first clutch C1 is not abruptly started and releasing shock can be prevented.

On the other hand, even if the engine R.P.M. $N_E$ is lowered by some cause, it is possible to establish the state immediately before the application of the first clutch C1 is started. As a result, the fuel economy can be improved without elongating the time required for release.

Step S3-7: The engine R.P.M. $N_E$ corresponding to the input torque $T_T$ is again detected.

Step S3-8: The input torque change deciding means decides whether or not the engine R.P.M. $N_E$ has changed, as compared with the reference engine R.P.M. $N_{Em}$. The subroutine advances to Step S3-9, if the answer is NO, but to Step S3-10 if YES.

Step S3-9: The throttle pressure $P_{TH}$ or the C-1 oil pressure $P_{C1}$ is reduced (or swept down) by a set pressure $P_{THDOWN}$ each time a set period of time $T_{DOWN}$ lapses, as specified by the following equation:

$P_{TH}=P_{TH}-P_{THDOWN}$.

Step S3-10: The oil pressure changing means sets the reference engine R.P.M. $N_{Em}$ at the value of the engine R.P.M. $N_E$ at the time when it is decided at Step S3-8 that the engine R.P.M. $N_E$ has changed, as compared with the reference engine R.P.M. $N_{Em}$, and changes the C-1 oil pressure to a new value $P_{C1}$. The new value $P_{C1}$ is obtained by reducing a set oil pressure $P_1$, corresponding to the new reference engine R.P.M. $N_{Em}$, by an oil pressure increment $\Delta P$ which corresponds to the increment of reduction by the aforementioned second pressure-reducing means 944 for the elapsed time period $\Delta t$, which begins at the instant when the aforementioned first pressure-reducing means 943 (of FIG. 1) reduces the C-1 oil pressure $P_{C1}$ to the set oil pressure $P_1$ and ends at the instant when it is decided that the engine R.P.M. $N_E$ has changed.

Figure 12:
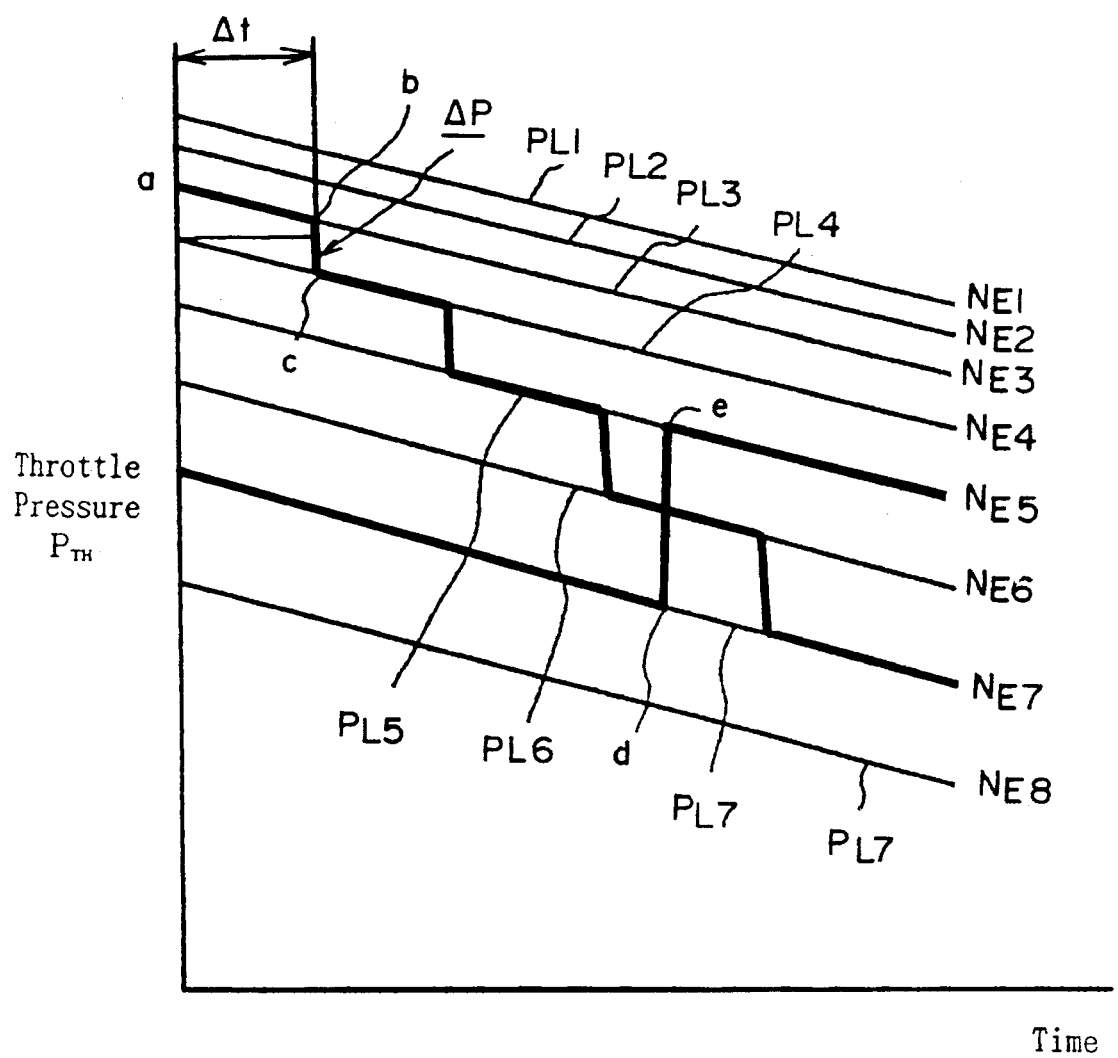
FIG. 12 is a time chart for throttle pressure, i.e a graph of throttle pressure $P_{TH}$ against time in the present invention.

In this case, the change in the C-1 oil pressure $P_{C1}$ is set according to the map which is illustrated by the time chart of FIG. 12.

In FIG. 12, lines PL1 to PL8 indicate the throttle pressures $P_{TH}$ which are set to correspond to the values $N_{E1}$ to $N_{E8}$ of the reference engine R.P.M. $N_{Em}$ for every 100 rpm. These lines are so sloped from the starting point (i.e., the point at 0 time) of the aforementioned set pressure $P_1$ as to drop by the set pressure $P_{THDOWN}$ for each lapse of the set time period $T_{DOWN}$.

Therefore, if the accelerator pedal is released with the brake pedal (not shown) being depressed, for example, satisfaction of the aforementioned specific set of conditions is detected by the specific condition detecting means 942 to start the release of the first clutch C1.

Moreover, if the engine R.P.M. $N_E$ takes the value $N_{E3}$ at the instant of detection of satisfaction of that set of conditions, the throttle pressure $P_{TH}$ at point a of the line PL3 is set as the set oil pressure $P_1$ so that it is lowered by the set pressure $P_{THDOWN}$ for each lapse of the set time period $T_{DOWN}$, from the point a, along the line PL3.

On the other hand, the engine R.P.M. $N_E$ gradually decreases as the accelerator pedal is released. As a result, the input torque $T_T$ decreases as the engine R.P.M. $N_E$ decreases, so that the first clutch C1 is restored to its applied state when the input torque $T_T$ becomes lower than the torque capacity $T_{C1}$ of the first clutch C1.

As a result, when the input torque $T_T$ so decreases, with decrease of the engine R.P.M. $N_E$, as to become lower than the torque capacity $T_{C1}$ of the first clutch C1, this first clutch C1 is restored to its applied state.

Therefore, if the input torque change deciding means decides that the engine R.P.M. $N_E$ has changed at point b to the value $N_{E4}$, as compared with the reference engine R.P.M. $N_{Em}$, the oil pressure changing means changes the throttle pressure $P_{TH}$ to the value at point c.

In this case, the throttle pressure $P_{TH}$ at the point c is lowered by the oil pressure $\Delta P$, which is the reduction in pressure achieved by the aforementioned second pressure-reducing means 944 for the time period extending from point a, i.e. the instant when the C-1 oil pressure $P_{C1}$ was lowered to the set oil pressure $P_1$ to the point b, i.e. the instant when it is decided that the engine R.P.M. $N_E$ has changed.

As a result, the throttle pressure $P_{TH}$ is stepwise reduced according to the decrease of the engine R.P.M. $N_E$, so that the time period for release of the first clutch C1 can be minimized, thereby retaining the effects of reducing vibration and improving fuel economy to the maximum.

Figure 10:
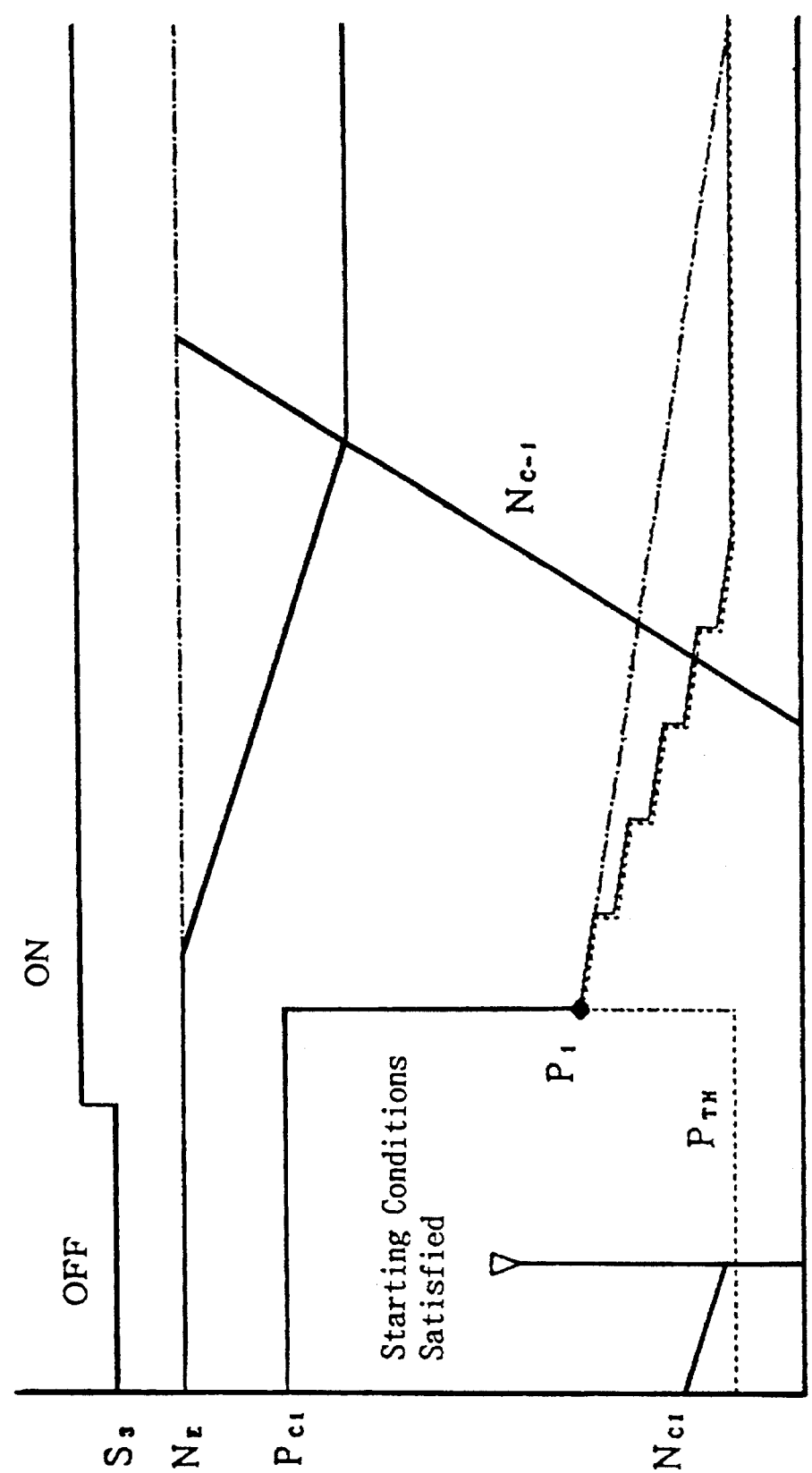
FIG. 10 is a time chart for the 1st clutch releasing subroutine of FIG. 8.
Figure 11:
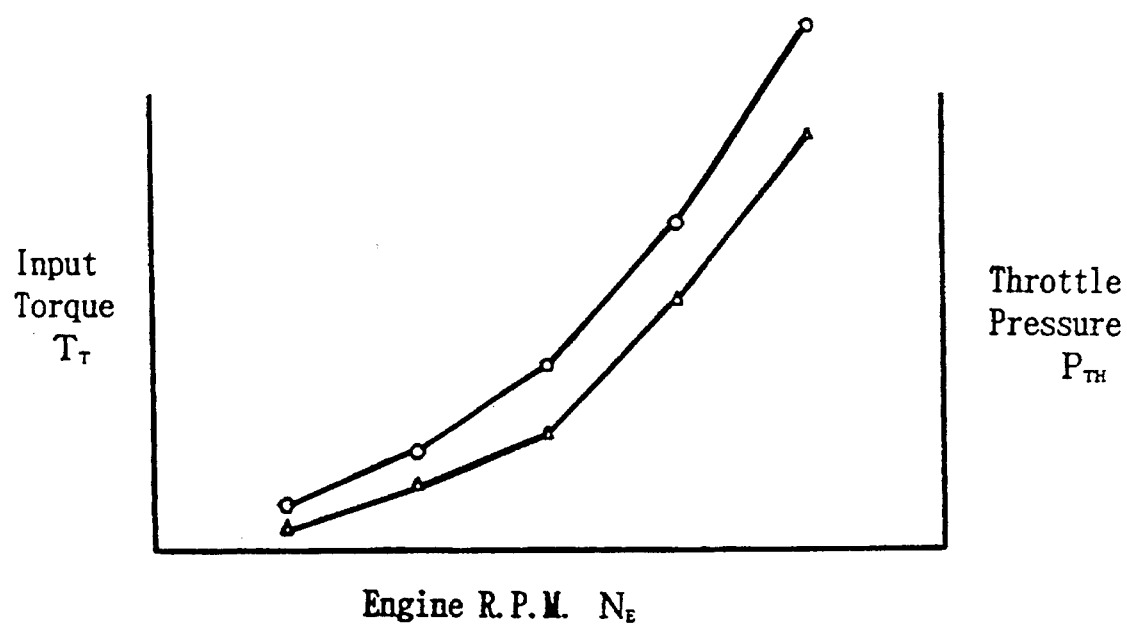
FIG. 11 is a graph plotting input torque $T_T$ ($t \cdot C \cdot N_E^2$) [kg·m] and throttle pressure $P_{TH}$ [kg/cm$^2$] against engine R.P.M. in the present invention.

Incidentally, the single-dotted line in FIG. 10 plots the engine R.P.M. $N_E$ and the throttle pressure $P_{TH}$ for the case where the engine R.P.M. $N_E$ does not change, as compared with the reference engine R.P.M. $N_{Em}$. In the case where the engine R.P.M. $N_E$ changes, as compared with the reference engine R.P.M. $N_{Em}$, the time period for releasing the first clutch C1 is extended more than necessary if the throttle pressure $P_{TH}$ drops, as indicated by the single-dotted line.

Moreover, when the input torque $T_T$ decreases with a decrease of the engine R.P.M. $N_E$, as plotted in FIG. 19, the throttle pressure $P_{TH}$ is stepwise reduced in a manner to correspond to the engine R.P.M. $N_E$ so that the torque capacity $T_{C1}$ is reduced. As a result, the input torque $T_T$ is not lower than the torque capacity $T_{C1}$ of the first clutch C1 so that the first clutch C1 is prevented from application.

Moreover, if the idling rate is raised after detection of satisfaction of the specific set of preconditions for release of the first clutch C1, the input torque $T_T$ is increased according to the increase in the engine R.P.M. $N_E$ so that the first clutch C1 is abruptly released.

Therefore, if the input torque change deciding means decides that the engine R.P.M. $N_E$ has changed at point d, as compared with the reference engine R.P.M. $N_{Em}$, from the value $N_{E7}$ to the value $N_{E5}$, the oil pressure changing means changes the throttle pressure $P_{TH}$ to the value at point e.

Thus, the time period for release of the first clutch C1 remains constant even in the case of an increase in the rate of idle, to provide stable releasing characteristics.

Step S3-11: After the first clutch C1 has started to slip, the pressure reduction of Step S3-9 is continued till a speed ratio e, as defined by the following equation, exceeds a constant $e_1$:

$e=N_{C1}/N_E$.

When the speed ratio e exceeds the constant $e_1$, the pressure reduction of Step S3-9 is interrupted. The constant $e_1$ is set, for example to 0.75, by considering the delay in the change of the clutch input side R.P.M. $N_{C1}$ by control of the oil pressure at the time when the first clutch C1 is released. Incidentally, the speed ratio e may be replaced by the clutch input side R.P.M. $N_{C1}$.

Application of the first clutch C1 can not adequately be detected merely by deciding whether or not the rotational difference $\Delta N$ has changed, because this rotational difference $\Delta N$ does not change no matter whether the first clutch C1 might be completely applied or released. This makes it difficult to distinguish between the state in which the first clutch C1 is completely applied, and the state in which the first clutch C1 is released.

Therefore, the state immediately before the application of the first clutch C1 is started can be established without fail by waiting until the speed ratio e exceeds the constant $e_1$.

Figure 13:
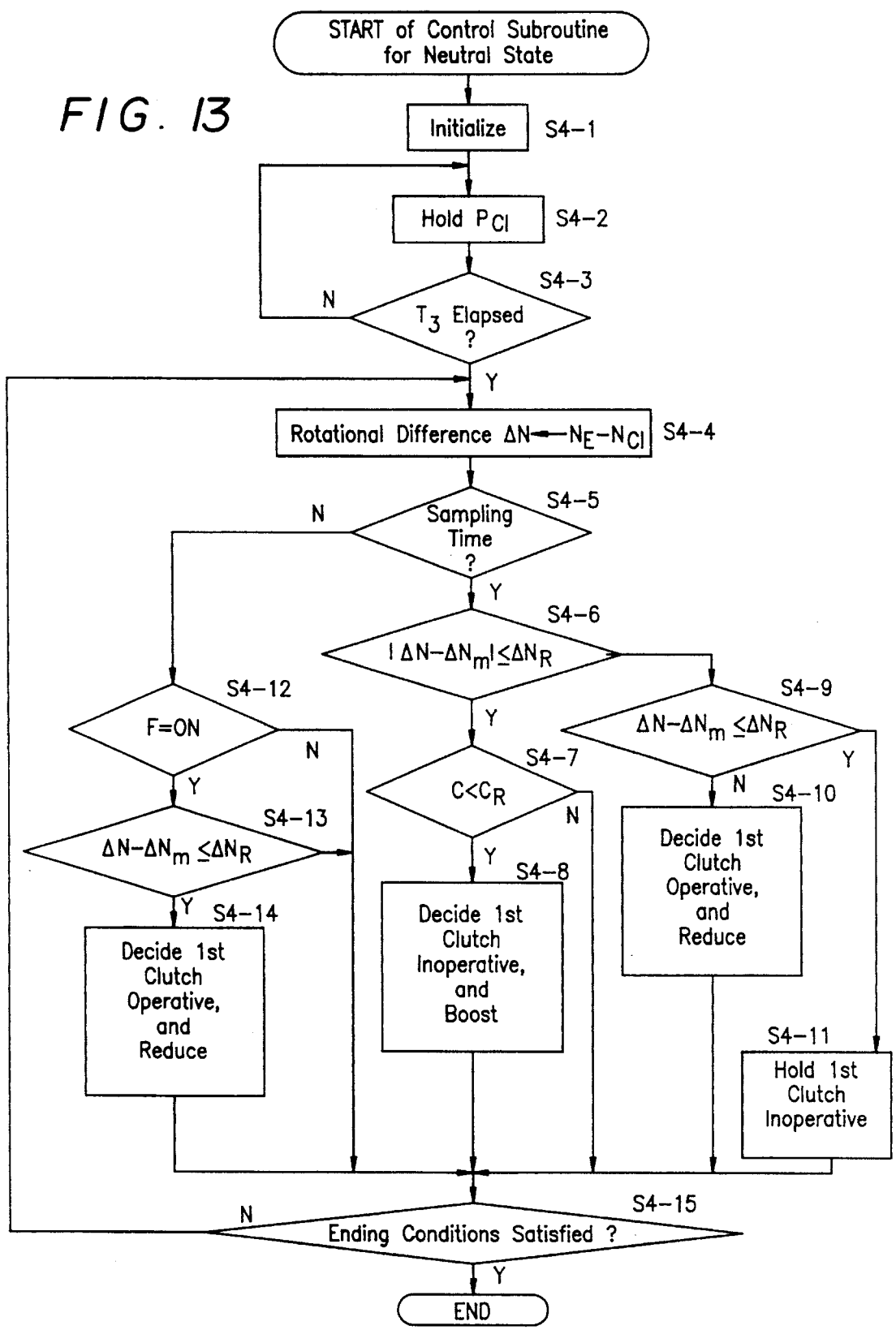
FIG. 13 is a flow chart of a subroutine for neutral state control in the embodiment of FIG. 6 (step S4)
Figure 14:
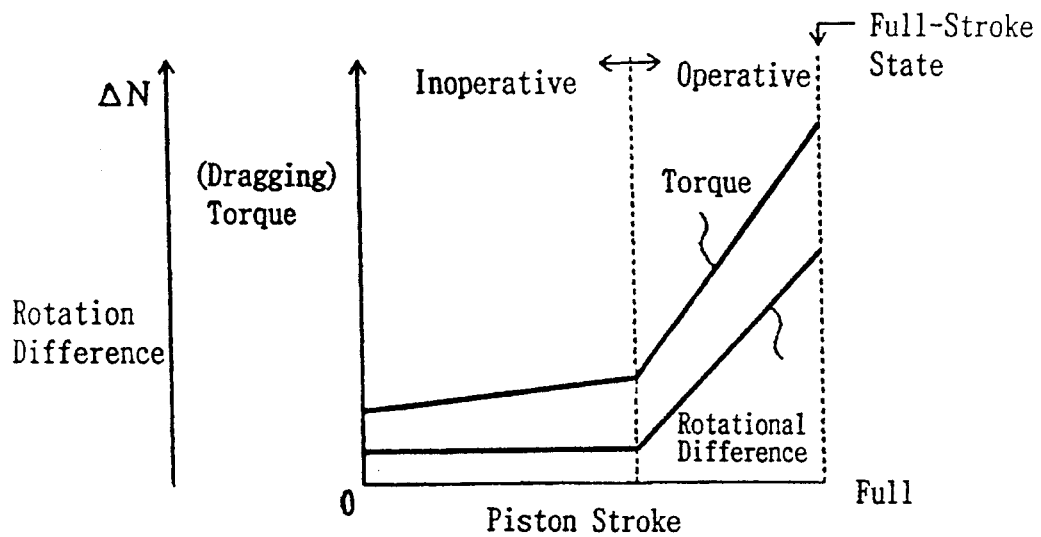
FIG. 14 is a graph of piston stroke of the 1st clutch in the neutral control state versus the rotational difference $\Delta N$ (and dragging torque) in the present invention.
Figure 15:
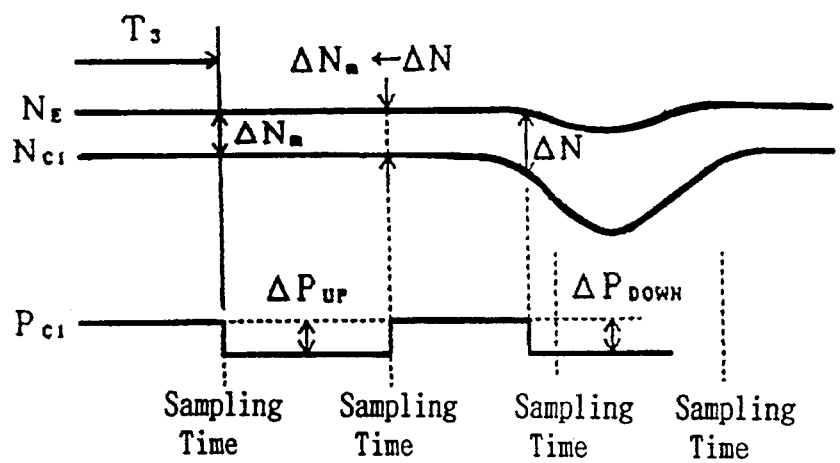
FIG. 15 is a time chart of changes in the engine R.P.M., in the R.P.M. at the clutch input side and in the C-1 oil pressure in the neutral control of the present invention.

With reference to FIGS. 13 to 15, the subroutine for Step S4 of FIG. 6, i.e. for controlling the neutral state, will now be described with reference to FIGS. 13 to 15.

Step S4-1: The initial values of a hydraulic control flag F, the counted value C of the counter (not shown) and the reference rotational difference $\Delta Nm$ are set as follows:

F←OFF;

C←0; and $\Delta Nm$←the value ($N_E$- $N_{C1}$) at this time.

Steps S4-2 and S4-3: The C-1 oil pressure $P_{C1}$ is held at the final value in the first clutch releasing subroutine. If it is decided whether or not the rotational difference $\Delta N$ has changed, immediately after confirmation that the first clutch C1 has released to a predetermined extent, the decision may be mistaken due to the change in the rotational difference $\Delta N$ because of the pressure reduction in the first clutch releasing subroutine. By using the timer (not shown), therefore, the routine waits until a time period $T_3$ has elapsed, continuing to hold the C-1 oil pressure $P_{C1}$. As a result, the decision of whether or not the rotational difference $\Delta N$ has changed is delayed so that the C-1 oil pressure $P_{C1}$ can be prevented from being controlled in an unstable state immediately after the first clutch C1 has been released.

Step S4-4: The rotational difference $\Delta N$ between the engine R.P.M. $N_E$ and the clutch input side R.P.M. $N_{C1}$ is calculated.

Step S4-5: It is decided whether or not a predetermined time for sampling is reached, that is, whether or not a time period such as 1.0 sec. or 0.5 sec. has elapsed. The subroutine advances to Step S4-6, if the answer is YES, and to Step S4-12 if NOT.

Step S4-6: It is decided whether or not the absolute value of the difference between the rotational difference $\Delta N$ and the reference rotational difference $\Delta N_m$ is no more than a preset value $\Delta N_R$, that is, whether or not the change in the rotational difference $\Delta N$ is no more than the preset value $\Delta N_R$. The subroutine advances to Step S4-7, if the answer is YES, and to Step S4-9 if NO. The set value $N_R$ is preset to discriminate between the operative state and the inoperative state of the first clutch C1, as shown in FIG. 4.

If a fault occurs in one of the input side and output side R.P.M. sensors or if an error occurs in calculation of the rotational difference $\Delta N$, it may be erroneously decided that the rotational difference $\Delta N$ has changed. Taking into account that the rotational difference $\Delta N$ abruptly changes if the application of the first clutch C1 is started from the state immediately before the application (a position in readiness for application), therefore, it is decided that the rotational difference $\Delta N$ has changed if the change in the rotational difference $\Delta N$ exceeds the set value $\Delta N_R$. Thus, it is possible to prevent an erroneous decision of whether or not the rotational difference $\Delta N$ has changed.

Moreover, if the set value $\Delta N_R$ is changed according to the oil temperature, the C-1 oil pressure $P_{C1}$ can be excellently controlled regardless of whether the oil is hot or cold.

Step S4-7: It is decided whether or not the count value C of the counter is smaller than a set value $C_R$. The subroutine advances to Step S4-8, if the answer is YES, and to Step S4-15 if NO.

Step S4-8: It is decided that the first clutch C1 is in the inoperative state, because there is no change in the rotational difference $\Delta N$. Since, in this state, the clutch piston may have excessively returned, the C-1 oil pressure $P_{C1}$ is boosted by a set pressure $\Delta P_{UP}$ in the following manner, as illustrated in FIG. 15:

$P_{C1}$←$P_{C1}$+$\Delta P_{UP}$.

Moreover, the rotational difference $\Delta N$ is set to the reference rotational difference $\Delta N_m$, and the oil pressure control flag F is turned ON, as follows:

$\Delta N_m$←+$\Delta N$; and

F←ON.

Step S4-9: It is decided whether or not the tendency in the change in the rotational difference $\Delta N$ is a decrease, that is, whether or not the difference of the rotational difference $\Delta N$ from the reference rotational difference $\Delta N_m$ is no more than the set value $\Delta N_R$. The subroutine advances to Step S4-11, if the answer is YES, and to Step S4-10 if NO.

Step S4-10: It is decided that the first clutch C1 is transferring from the inoperative state to the operative state, and the C-1 oil pressure $P_{C1}$ is reduced by the set pressure $\Delta P_{DOWN}$, as follows:

$P_{C1}$←$P_{C1}$-$P_{DOWN}$.

Moreover, the rotational difference $\Delta N$ is set to the reference rotational difference $\Delta N_m$; the oil pressure control flag F is turned OFF; and the value "1" is subtracted from the count value of the counter. Moreover, the C-1 oil pressure $P_{C1}$ at this instant is set as the reference C-1 oil pressure $P_{C1}m$, as follows:

$\Delta Nm$←$\Delta N$;

F←OFF;

C←C−1 (wherein C=0 if C<0); and $P_{C1m}$←$P_{C1}$.

Step S4-11: Since it is decided that the first clutch C1 is transferring from the operative state to the inoperative state, the C-1 oil pressure $P_{C1}$ is held at the value at this instant, and the oil pressure control flag F is turned OFF, as follows:

F←OFF.

In other words, when the first clutch C1 is transferring from the operative state to the inoperative state, the rotational difference $\Delta N$ decreases. If, at this time, the C-1 oil pressure $P_{C1}$ is further lowered, the clutch piston may be abruptly retracted to establish an excessive stroke loss. In case, therefore, the first clutch C1 is transferring from the operative state to the inoperative state, the reduction of the C-1 oil pressure $P_{C1}$ is once inhibited and held at the value of that instant.

Step S4-12: It is decided whether or not the oil pressure control flag F is ON, that is, whether or not the C-1 oil pressure $P_{C1}$ has been boosted at the previous sampling time. The subroutine advances to Step S4-13, if the oil pressure control flag F is ON, and to Step S4-15 if OFF.

Step S4-13: Since the C-1 oil pressure $P_{C1}$ was boosted at the previous sampling time, it is decided whether or not the difference of the rotational difference $\Delta N$ from the reference rotational difference $\Delta N_m$ is no more than the set valve $\Delta N_R$.

The subroutine advances to Step S4-14, if the answer is YES, and to Step S4-15 if NO.

Step S4-14: Since the C-1 oil pressure $P_{C1}$ was boosted at the previous sampling time, the rotational difference $\Delta N$ has changed. Hence, it is decided that the first clutch C1 is applied, and the C-1 oil pressure $P_{C1}$ is reduced by the set pressure $\Delta P_{DOWN}$, as follows:

$P_{C1} \leftarrow P_{C1} \leftarrow P_{DOWN}$.

Moreover, the rotational difference $\Delta N$ is set to the reference rotational difference $\Delta N_m$; the oil pressure control flag F is turned OFF; and the count value of the counter is incremented by "1". Then, as at Step S4-10, the C-1 oil pressure $P_{C1}$ at this instant is set as the reference C-1 oil pressure $P_{C1m}$, as follows:

$\Delta Nm \leftarrow \Delta N$;

$F \leftarrow OFF$;

$C \leftarrow C+1$; and $P_{C1m} \leftarrow P_{C1}$.

As described above, it is decided whether or not the rotational difference has changed at each instance of sampling. If the C-1 oil pressure $P_{C1}$ is boosted according to that decision, the application of the first clutch C1 may be instantly started, inviting slipping engagement to start the transmission of torque, thereby generating the idling vibration. If, therefore, the rotational difference $\Delta N$ increases while the first clutch C1 is starting to engage, the C-1 oil pressure $P_{C1}$ is lowered without awaiting the next sample time. Thus, the first clutch C1 can be prevented from coming into slipping engagement, thereby preventing idling vibration.

As described above, the C-1 oil pressure $P_{C1}$ is changed only if the change in the rotational difference $\Delta N$ is higher than the set value $\Delta N_R$ at each sampling time. If, in this case, the rotational difference $\Delta N$ changes little by little, for example, the C-1 oil pressure $P_{C1}$ may not be changed although the first clutch C1 has already come into the engaging state. By updating the reference rotational difference $\Delta N_m$ only when the C-1 oil pressure $P_{C1}$ is changed, therefore, this change of the C-1 oil pressure $P_{C1}$ can be ensured, even when the rotational difference $\Delta N$ is changed little by little, so that the first clutch C1 comes into the engaging state.

Step S4-15: It is decided whether or not the conditions for ending the neutral state control for the first clutch C1 are satisfied. This neutral condition controlling subroutine is ended, if the answer is YES. If NO, the subroutine returns to Step S4-4, and the aforementioned Steps are repeated.

Figure 16:
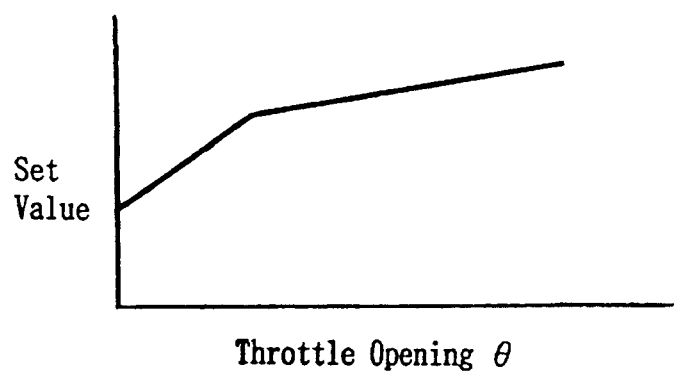
FIG. 16 is a graph of set value of C-1 pressure (vertical axis) against throttle opening (horizontal axis) in the present invention.
Figure 17:
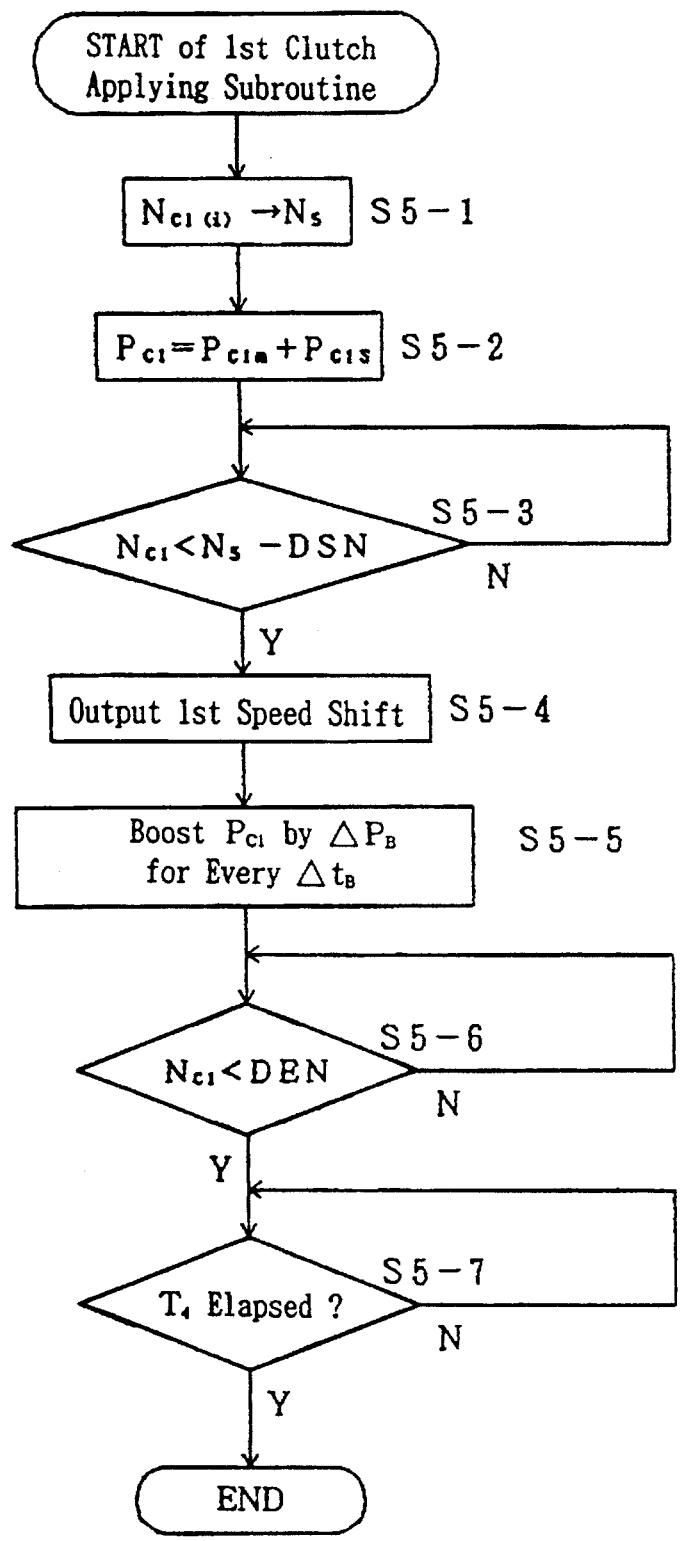
FIG. 17 is a flow chart showing a 1st clutch applying subroutine, i.e. for step S5 in the main routine of FIG. 6.
Figure 18:
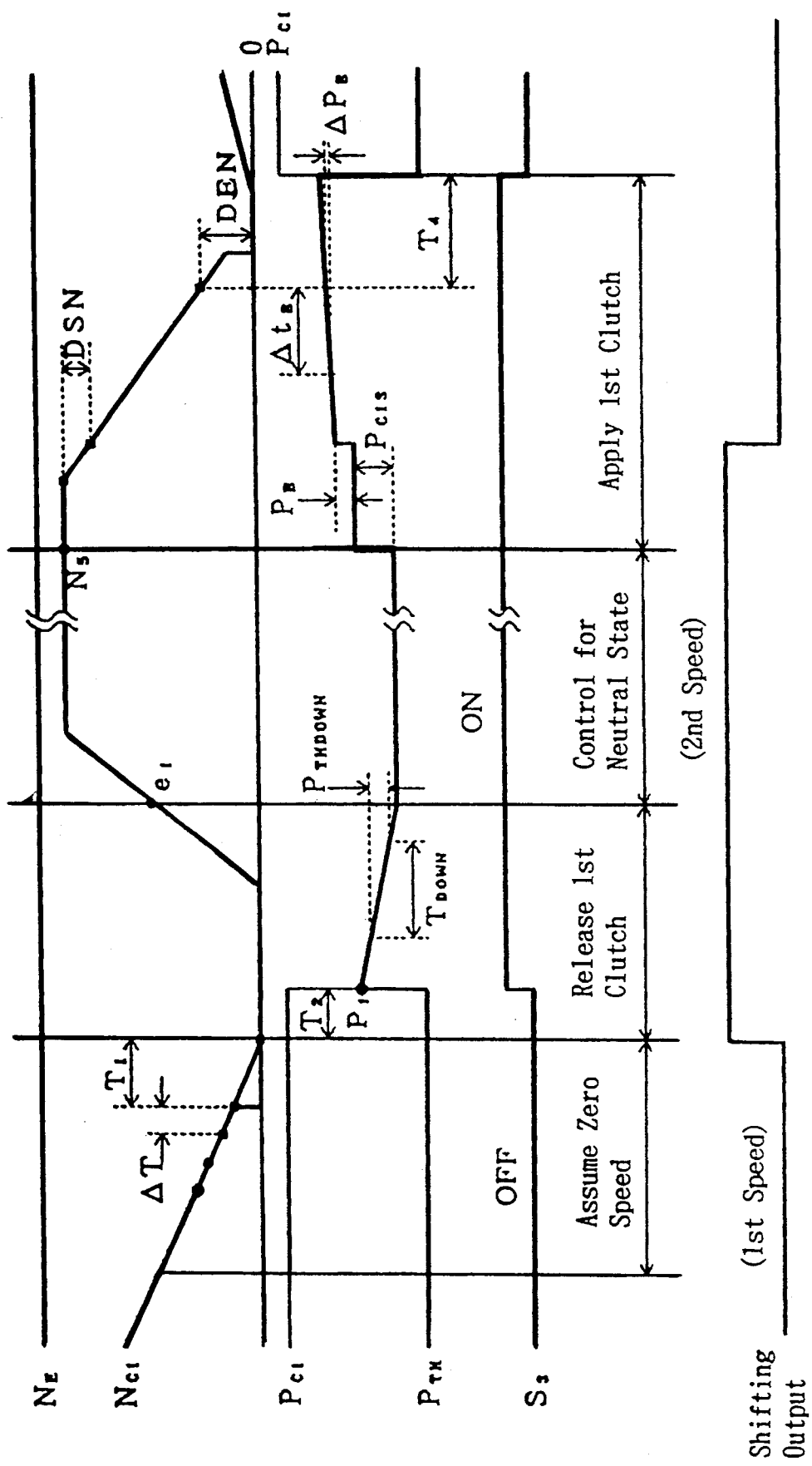
FIG. 18 is a time chart of various control parameters in the present invention.

With reference to FIGS. 16 to 17, here will be described the subroutine of Step S5 of FIG. 6 for applying the first clutch.

Step S5-1: The clutch input side R.P.M. $N_{C1(i)}$ at the instant when the conditions for ending the control of the neutral state have been satisfied is stored as a value $N_S$ in the memory (not shown) in the automatic transmission control system 41 (of FIG. 2).

Step S5-2: A constant $P_{C1S}$ is added to the reference C-1 oil pressure $P_{C1m}$ set at Steps S4-10 and S4-11, and the sum is set as the C-1 oil pressure $P_{C1}$. Incidentally, the constant $P_{C1S}$ is set to a value sufficient to ensure a stroke of the piston (not shown) of the hydraulic servo C-1 (of FIG. 5) and sufficient to reduce the shock resulting from the engagement.

Step S5-3: The routine waits until the clutch input side R.P.M. $N_{C1}$ becomes smaller than the difference of the value $N_S$ subtracted a constant DSN. When the clutch input side R.P.M. $N_{C1}$ is smaller than that difference, the start of the application of the first clutch C1 is decided, and the subroutine advances to Step S5-4.

Step S5-4: The 1st speed shifting output is generated.

Step S5-5: The throttle pressure $P_{TH}$ from the linear solenoid valve 66 (of FIG. 4) is changed, and the C-1 oil pressure $P_{C1}$ is boosted to a pressure $P_B$. After this, the C-1 oil pressure $P_{C1}$ is boosted by a set pressure $\Delta P_B$ for every lapse of a time period $\Delta t_B$ to thereby continue the application of the first clutch C1.

Step S5-6: The routine waits for the clutch input side R.P.M. $N_{C1}$ to become lower than the constant DEN.

Step S5-7: The timer (not shown) is used to await elapse of a time period T4.

In step S5-7, the aforementioned set values such as the constant $P_{C1S}$, the pressure $P_B$ and the set pressure $\Delta P_B$ are set on the basis of a variable such as the throttle opening $\theta$ corresponding to the input torque $T_T$.

Thus, even when the preconditions for start of the neutral state control are satisfied when the engine state changes, the generation of releasing shock can always be minimized to shorten the releasing time period and to improve the fuel economy.

Figure 19:
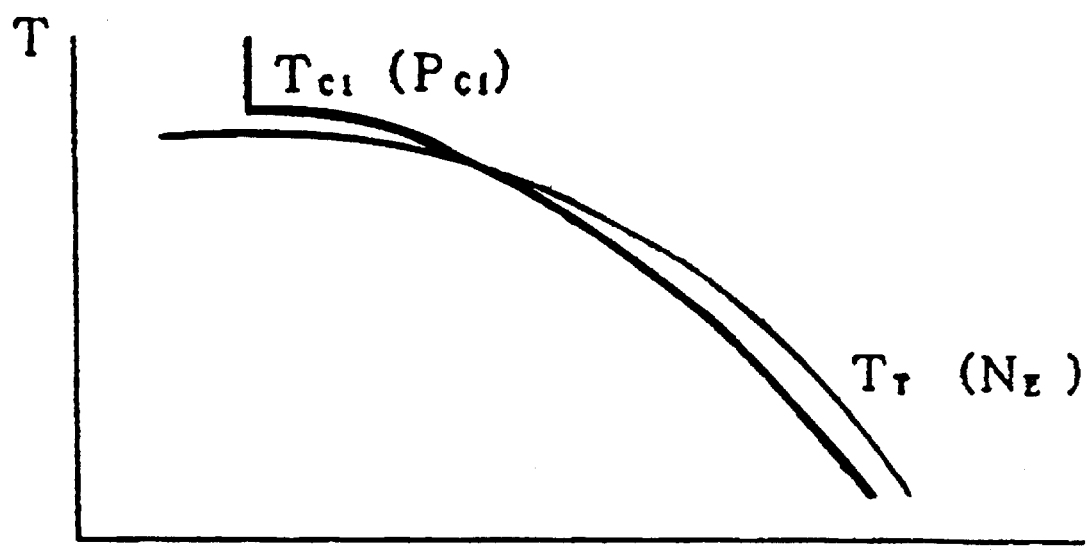
FIG. 19 is a graph of input torque $T_T$ and torque capacity $T_{C1}$ of clutch C1 (vertical axis) versus time (horizontal axis) in the control system of one embodiment of the present invention.
Figure 20:
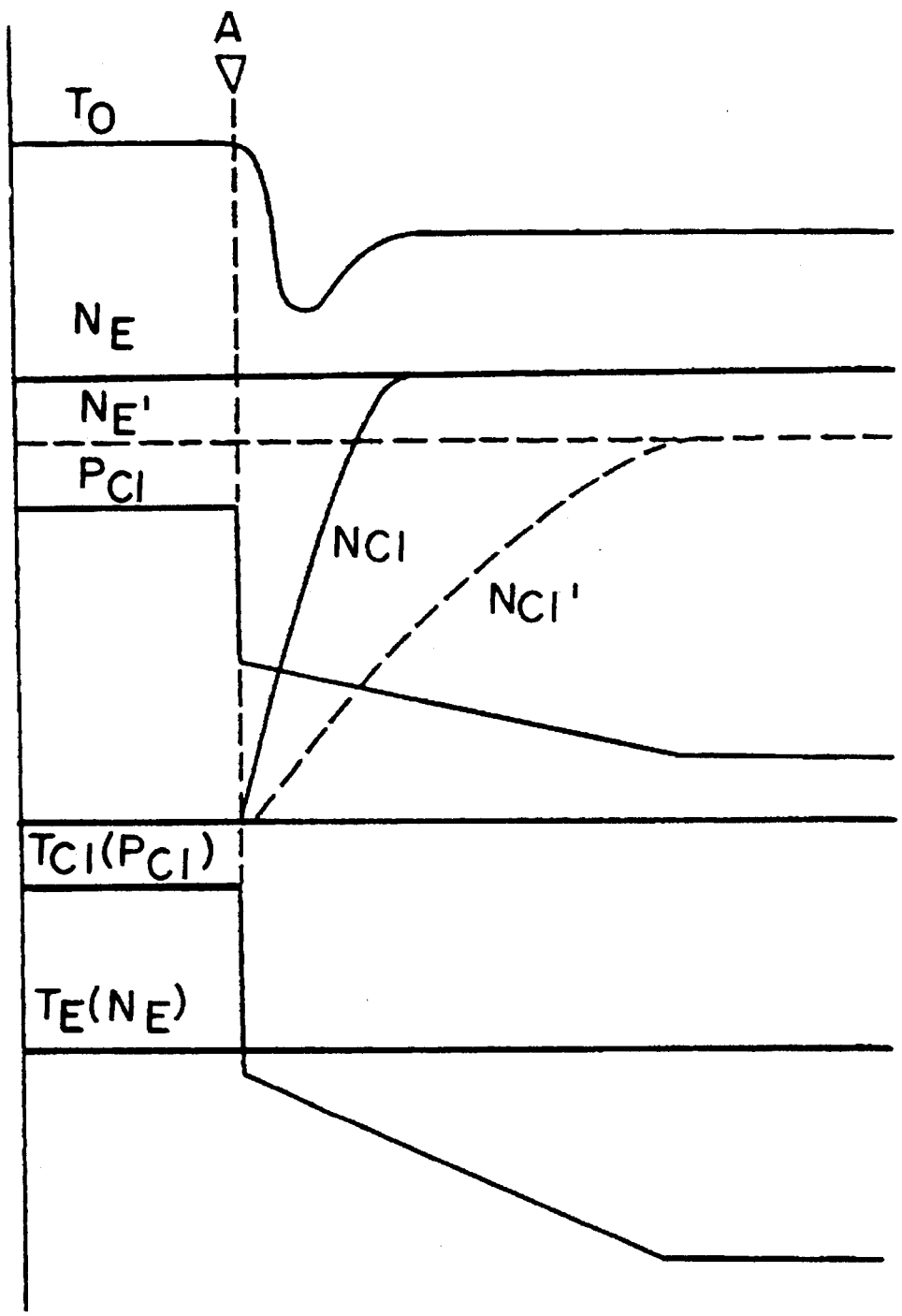
FIG. 20 is a first time chart illustrating operation of a prior art control system for an automatic transmission.
Figure 21:
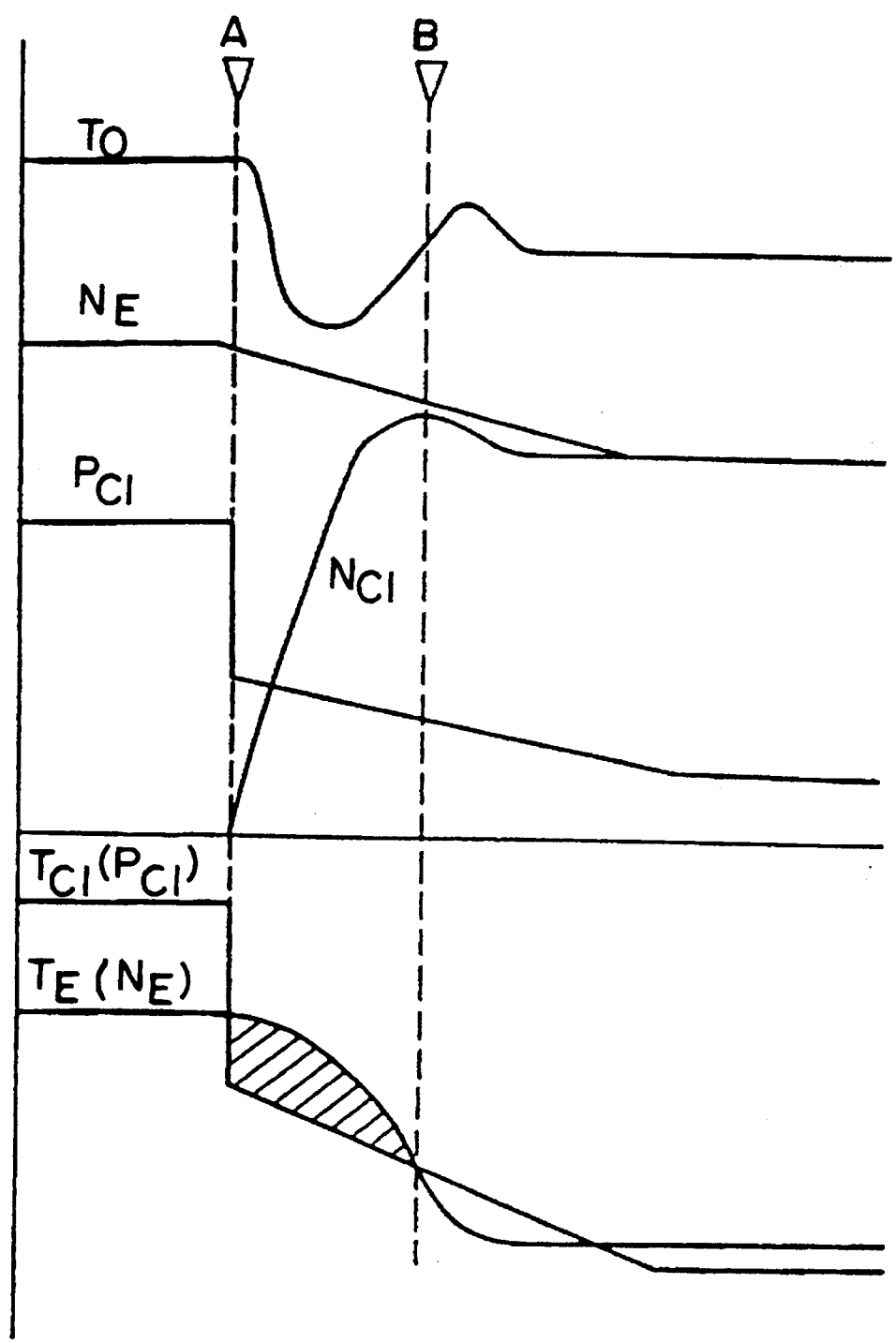
FIG. 21 is a second time chart illustrating operation of a prior art control system for an automatic transmission.

FIG. 19 is a graph of input torque versus time in the control system of the present invention. In FIG. 19, $T_T$ designates the input torque, and $T_{C1}$ designates the torque capacity of the first clutch C1. The input torque $T_T$ changes to correspond to the engine R.P.M. $N_E$ (of FIG. 11), and the torque capacity $T_{C1}$ changes to correspond to the C-1 oil pressure $P_{C1}$.

If, in this case, the conditions for starting control of the neutral state are satisfied, the C-1 oil pressure $P_{C1}$ rises according to the input torque $T_T$, i.e., the engine R.P.M. $N_E$. As a result, the release of the first clutch C1 is gradually started so that the releasing shock can be suppressed.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A control system for an automatic transmission in a vehicle drive train including an engine and a fluid coupling for transmitting the rotation of the engine to the transmission, the transmission including a clutch which is applied responsive to selection of a forward running range and a hydraulic servo which operates responsive to an oil pressure to apply said clutch, said control system comprising:

input torque detecting means for detecting input torque to said transmission;

starting condition detecting means for detecting satisfaction of a specific set of preconditions, said preconditions including (1) that the forward running range has been selected, (2) that the vehicle is stopped, and (3) that the engine is in an idling state; and a control unit for controlling the oil pressure of said hydraulic servo, said control unit setting the oil pressure of the hydraulic servo to a set pressure corresponding to the detected input torque at the instant satisfaction of said specific set of preconditions is detected, and comprising:

first pressure-reducing means for abruptly reducing the oil pressure of said hydraulic servo to said set oil pressure immediately prior to release of said clutch; and second pressure-reducing means for gradually further reducing the oil pressure of said hydraulic servo, which has been reduced to said set oil pressure by said first pressure-reducing means.

2. A control system for an automatic transmission, according to claim 1, further comprising:

input torque change deciding means for deciding whether or not said input torque has changed during the reduction of the oil pressure by said second pressure-reducing means; and oil pressure changing means for lowering the oil pressure of said hydraulic servo, when it is decided that said input torque has changed, from the oil pressure corresponding to the input torque at the time of the decision of change in said input torque to a lower oil pressure, said oil pressure changing means lowering the oil pressure of said hydraulic servo to the extent of the reduction the second pressure-reducing means would produce during the time period from the instant when said first pressure-reducing means reduced the oil pressure of said hydraulic servo to said set oil pressure to the instant when said input torque change deciding means decided that said input torque had changed, and wherein said second pressure-reducing means gradually reduces the oil pressure of said hydraulic servo from said lower oil pressure established by said oil pressure changing means, to release said clutch.

3. A control system for an automatic transmission, according to claim 1, wherein said input torque detecting means is an engine R.P.M. sensor for detecting the R.P.M. of the engine.

* * * * *

UNITED STATES PATENT AND TRADEMARK OFFICE
CERTIFICATE OF CORRECTION

PATENT NO. : 5,547,436
DATED      : August 20, 1996
INVENTOR(S): HAYABUCHI et al It is certified that error appears in the above-indentified patent and that said Letters Patent is hereby corrected as shown below:

Col. 10, line 23, after "of" insert  --$\Delta t$--.
Col. 13, line 63, "AN" should read --$\Delta N$--.
Col. 14, line 20, "$\Delta N_m \leftarrow +\Delta N$; and" should read --"$\Delta N_m \leftarrow \Delta N$; and--.

Signed and Sealed this

First Day of July, 1997

Attest:

BRUCE LEHMAN

Attesting Officer

Commissioner of Patents and Trademarks